US012543785B2

(12) United States Patent
Lee et al.

(10) Patent No.: US 12,543,785 B2
(45) Date of Patent: Feb. 10, 2026

(54) AEROSOL GENERATING DEVICE

(71) Applicant: KT&G CORPORATION, Daejeon (KR)

(72) Inventors: Won Kyeong Lee, Gyeonggi-do (KR); Jong Sub Lee, Gyeonggi-do (KR); Byung Sung Cho, Gyeonggi-do (KR)

(73) Assignee: KT&G Corporation, Daejeon (KR)

( * ) Notice: Subject to any disclaimer, the term of this patent is extended or adjusted under 35 U.S.C. 154(b) by 359 days.

(21) Appl. No.: 17/928,153

(22) PCT Filed: Aug. 1, 2022

(86) PCT No.: PCT/KR2022/011307

§ 371 (c)(1),
(2) Date: Nov. 28, 2022

(87) PCT Pub. No.: WO2023/022394

PCT Pub. Date: Feb. 23, 2023

(65) Prior Publication Data

US 2024/0237719 A1 Jul. 18, 2024

(30) Foreign Application Priority Data

Aug. 20, 2021 (KR) ........................ 10-2021-0110304
Oct. 27, 2021 (KR) ........................ 10-2021-0144964

(51) Int. Cl.

| | |
|---|---|
| ***A24F 40/42*** | (2020.01) |
| ***A24F 40/10*** | (2020.01) |
| ***B06B 1/06*** | (2006.01) |

(52) U.S. Cl.
CPC .............. *A24F 40/42* (2020.01); *A24F 40/10* (2020.01); *B06B 1/0644* (2013.01)

(58) Field of Classification Search
None
See application file for complete search history.

(56) References Cited

U.S. PATENT DOCUMENTS

| | | | |
|---|---|---|---|
| 6,296,196 | B1 | 10/2001 | Denen et al. |
| 6,439,474 | B2 | 8/2002 | Denen |
| 11,039,649 | B2 | 6/2021 | Hon |

(Continued)

FOREIGN PATENT DOCUMENTS

| | | | |
|---|---|---|---|
| CA | 3 180 786 A1 | | 5/2021 |
| CN | 1930958 A | * | 3/2007 |

(Continued)

OTHER PUBLICATIONS

Korean Office Action dated May 24, 2023 in Application No. 10-2021-0144964.

(Continued)

*Primary Examiner* — Cynthia Szewczyk
(74) *Attorney, Agent, or Firm* — Foley & Lardner LLP

(57) ABSTRACT

An aerosol generating device includes a storage configured to store an aerosol generating material, a liquid delivery element configured to absorb the aerosol generating material stored in the storage, and an atomizer configured to atomize the aerosol generating material absorbed by the liquid delivery element into an aerosol by generating ultrasonic vibrations, wherein the atomizer includes an oscillator, and the oscillator has a capacitance value of 0.6 nF to 1.1 nF.

12 Claims, 9 Drawing Sheets

(56) References Cited

U.S. PATENT DOCUMENTS

| | | | |
|---|---|---|---|
| 2004/0256486 | A1 | 12/2004 | Putvinski et al. |
| 2016/0279352 | A1 | 9/2016 | Wang et al. |
| 2016/0331037 | A1 | 11/2016 | Cameron |
| 2017/0119059 | A1 | 5/2017 | Zuber et al. |
| 2018/0325169 | A1 | 11/2018 | Guo et al. |
| 2020/0146353 | A1 | 5/2020 | Liu et al. |
| 2021/0015152 | A1 | 1/2021 | Li et al. |
| 2021/0178090 | A1 | 6/2021 | Lahoud et al. |
| 2022/0007727 | A1 | 1/2022 | Lee |

FOREIGN PATENT DOCUMENTS

| | | | | |
|---|---|---|---|---|
| CN | 109007974 | A | 12/2018 | |
| EP | 3 834 949 | A1 | 6/2021 | |
| JP | 2004-358457 | A | 12/2004 | |
| JP | 2019-502364 | A | 1/2019 | |
| JP | 2021-510494 | A | 4/2021 | |
| KR | 10-0477423 | B1 | 3/2005 | |
| KR | 10-2007-0087265 | A | 8/2007 | |
| KR | 10-2018-0122479 | A | 11/2018 | |
| KR | 10-2021-0015572 | A | 2/2021 | |
| WO | 2021/020861 | A1 | 2/2021 | |
| WO | WO-2021074254 | A1 * | 4/2021 | ............. A24F 40/20 |
| WO | 2021/130248 | A1 | 7/2021 | |

OTHER PUBLICATIONS

Extended European Search Report issued Oct. 30, 2023 in Application No. 22802858.5.

Notice of Reason for Refusal dated Feb. 6, 2024 in Application No. 2022-575868.

Chinese Office Action on CN Patent Application No. 202280004184.1 dated Nov. 15, 2025.

* cited by examiner

[Fig. 1]
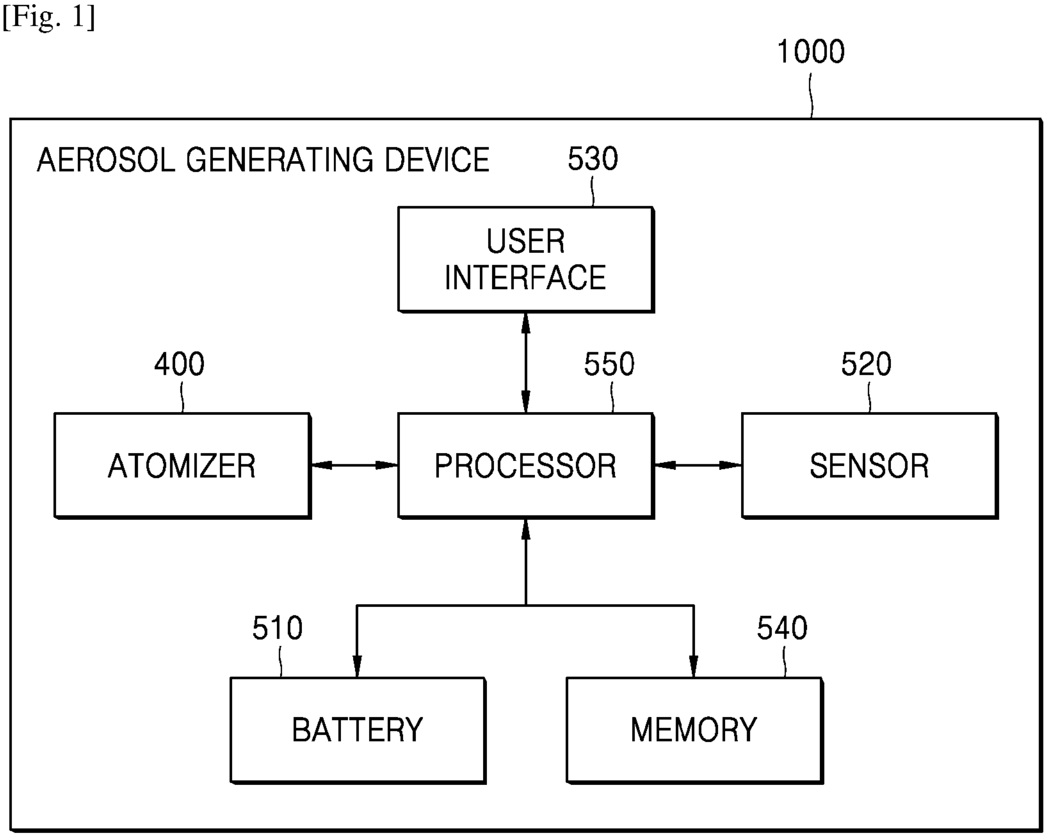

[Fig. 2]
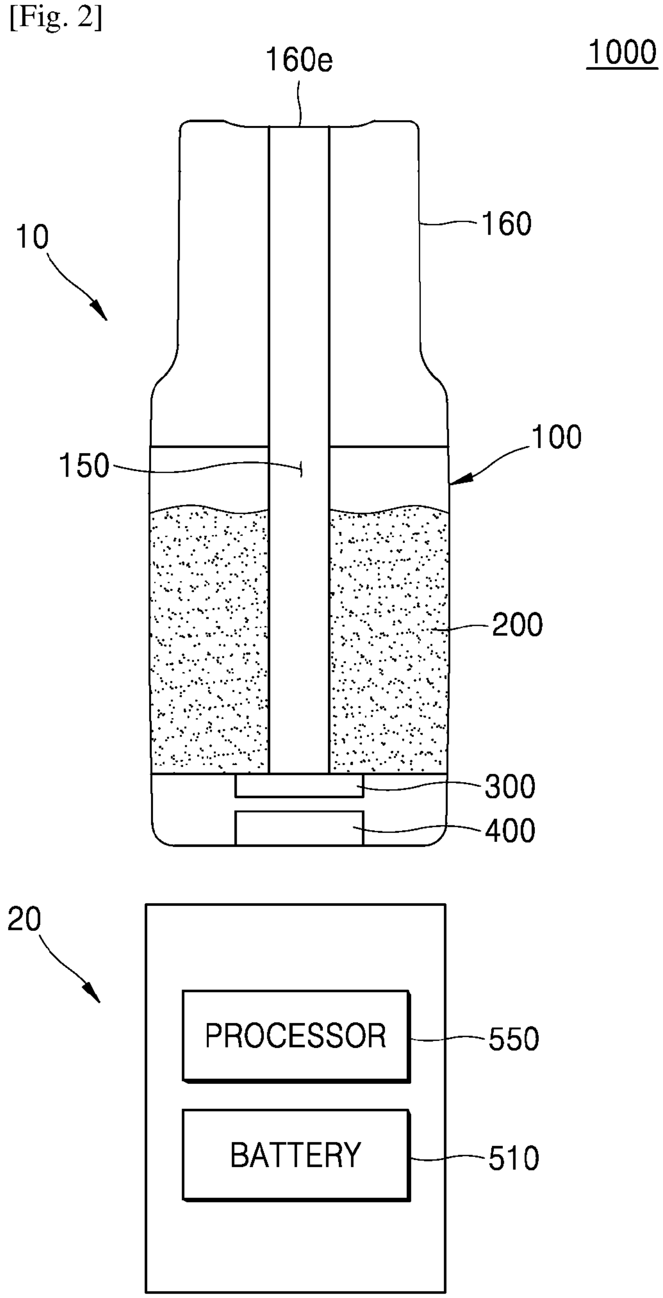

[Fig. 3]
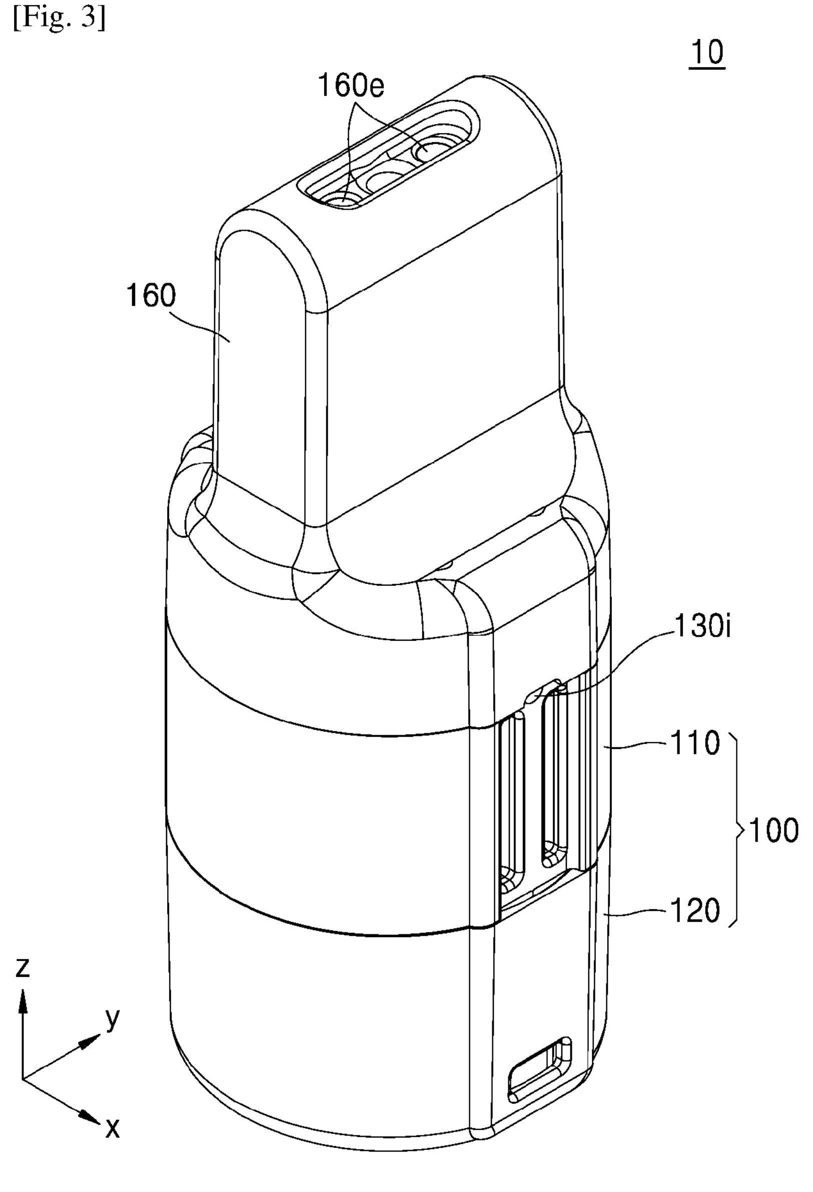

[Fig. 4]
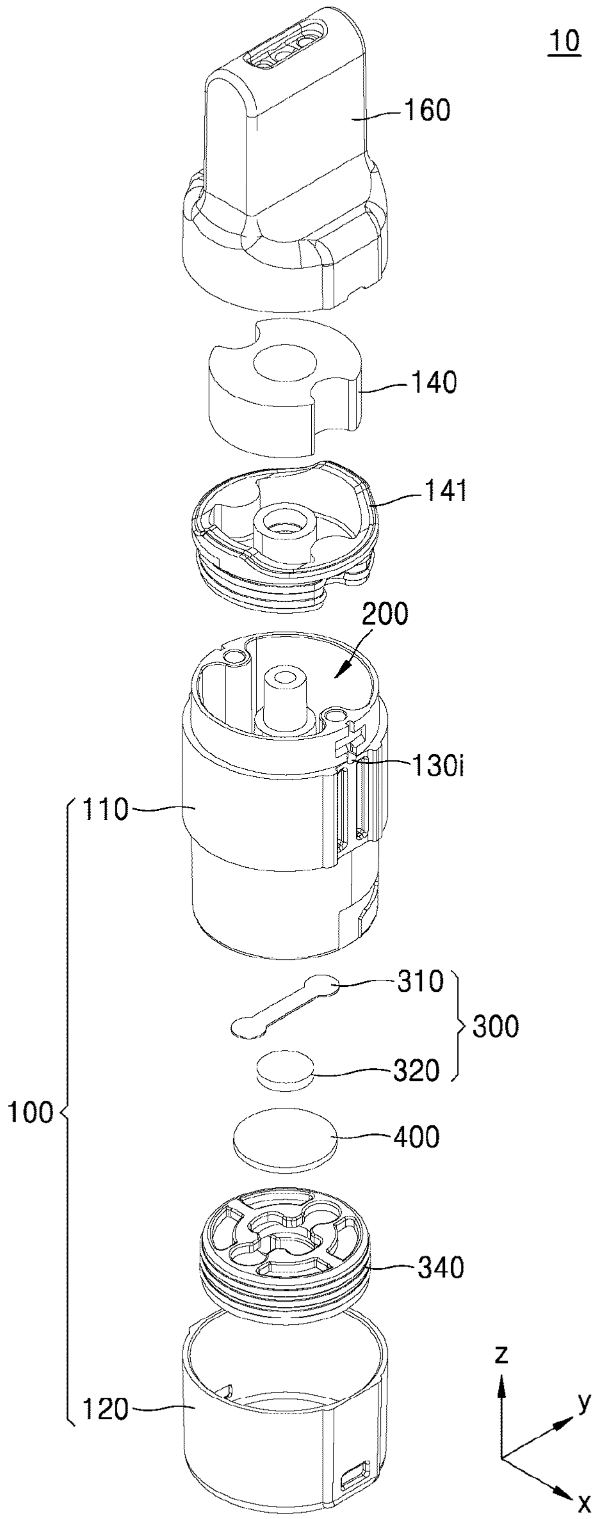

[Fig. 5]
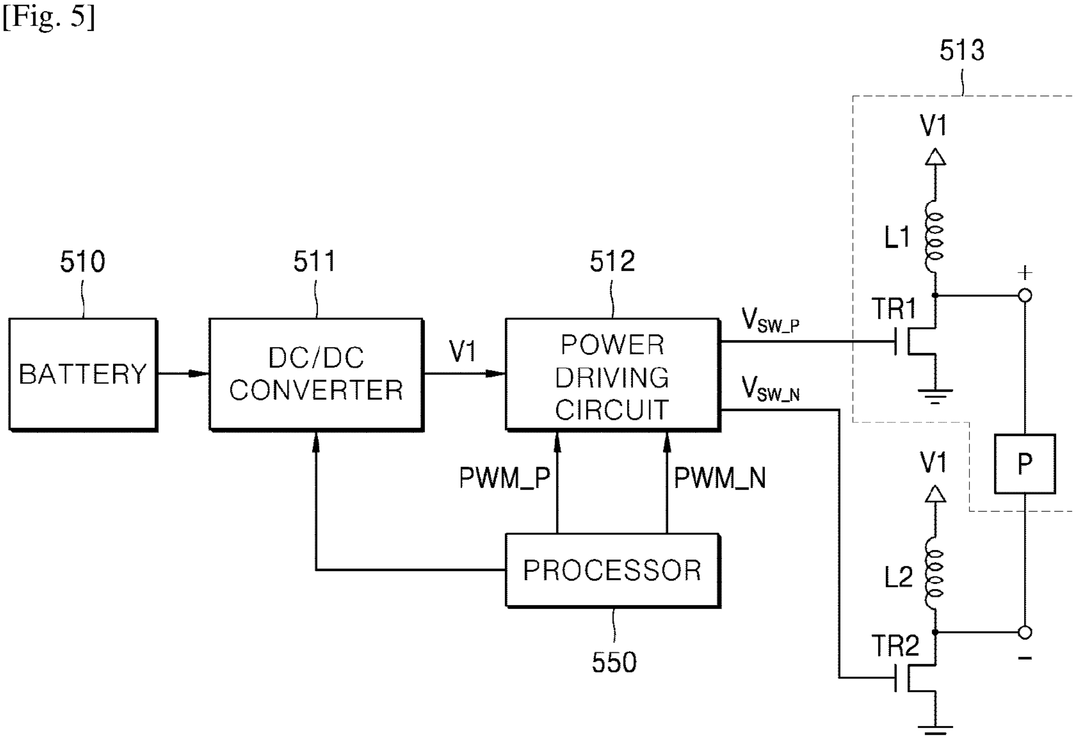
[Fig. 6]
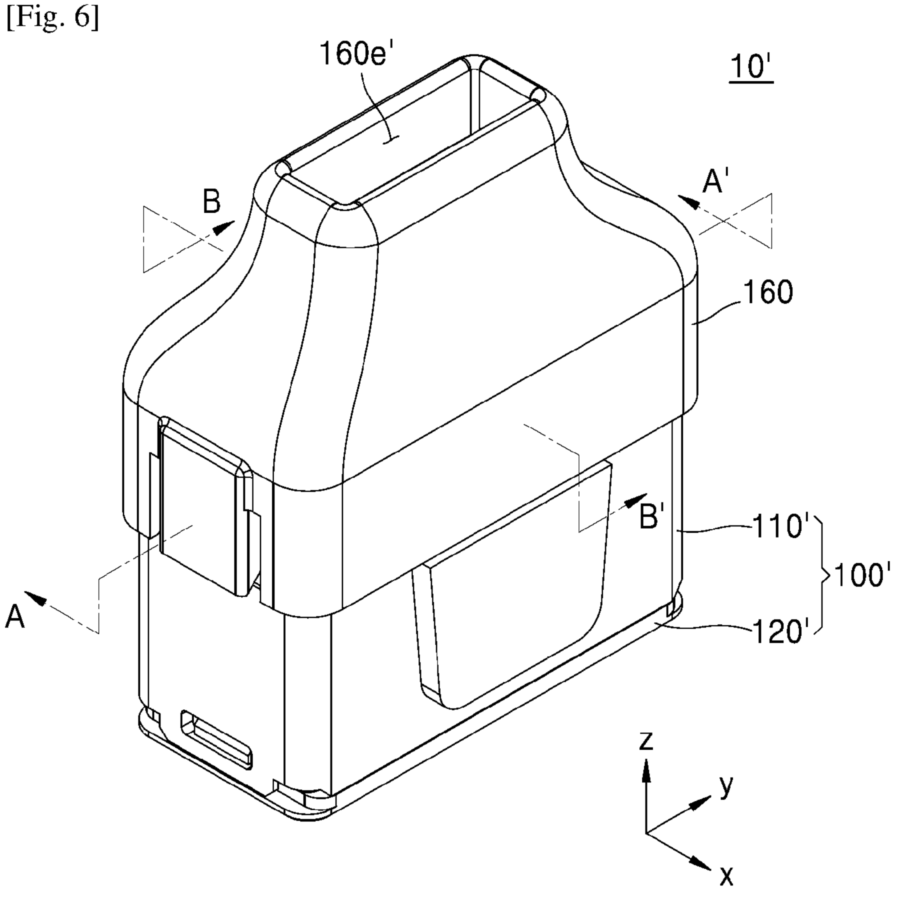

[Fig. 7]
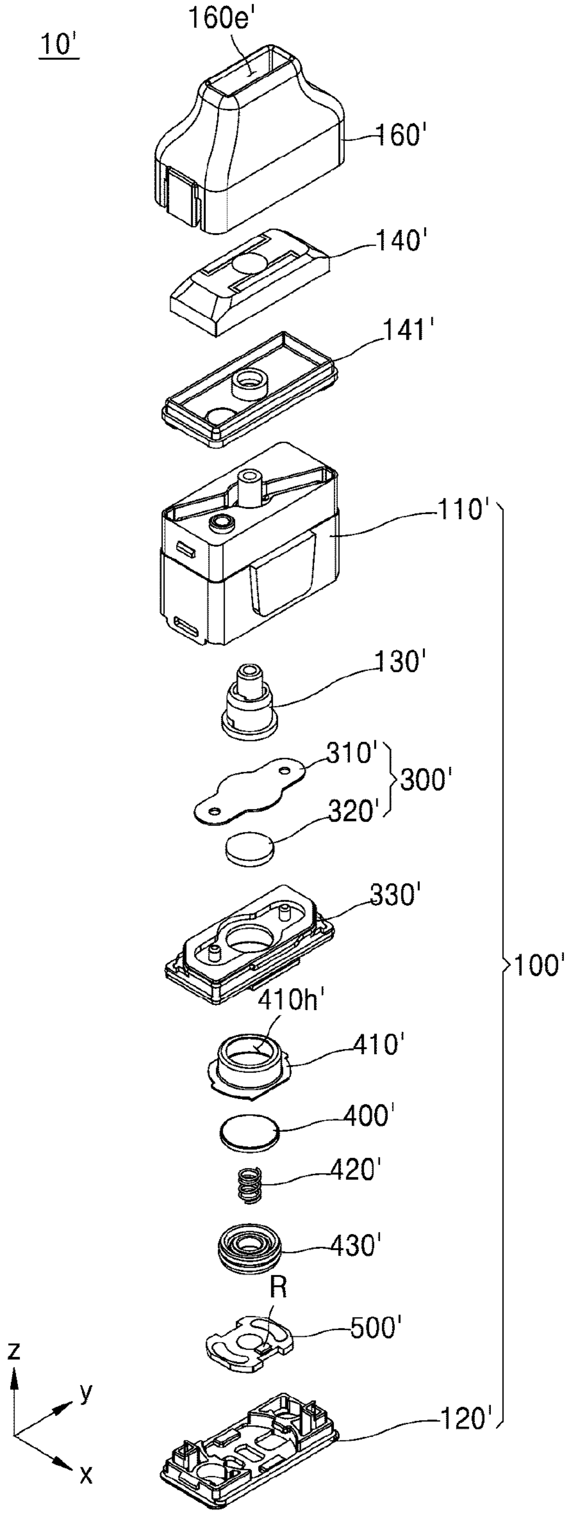

[Fig. 8]
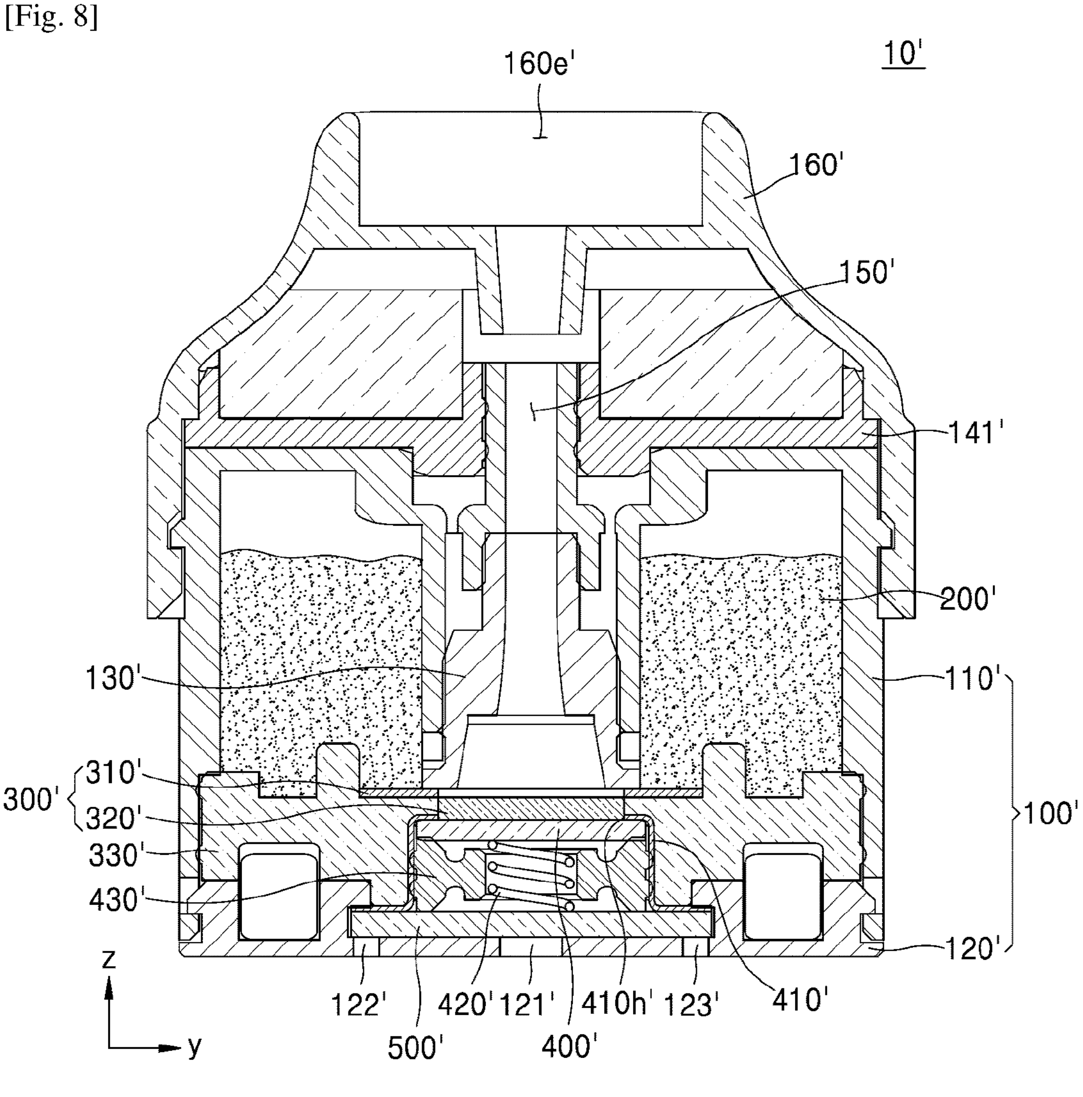

[Fig. 9]
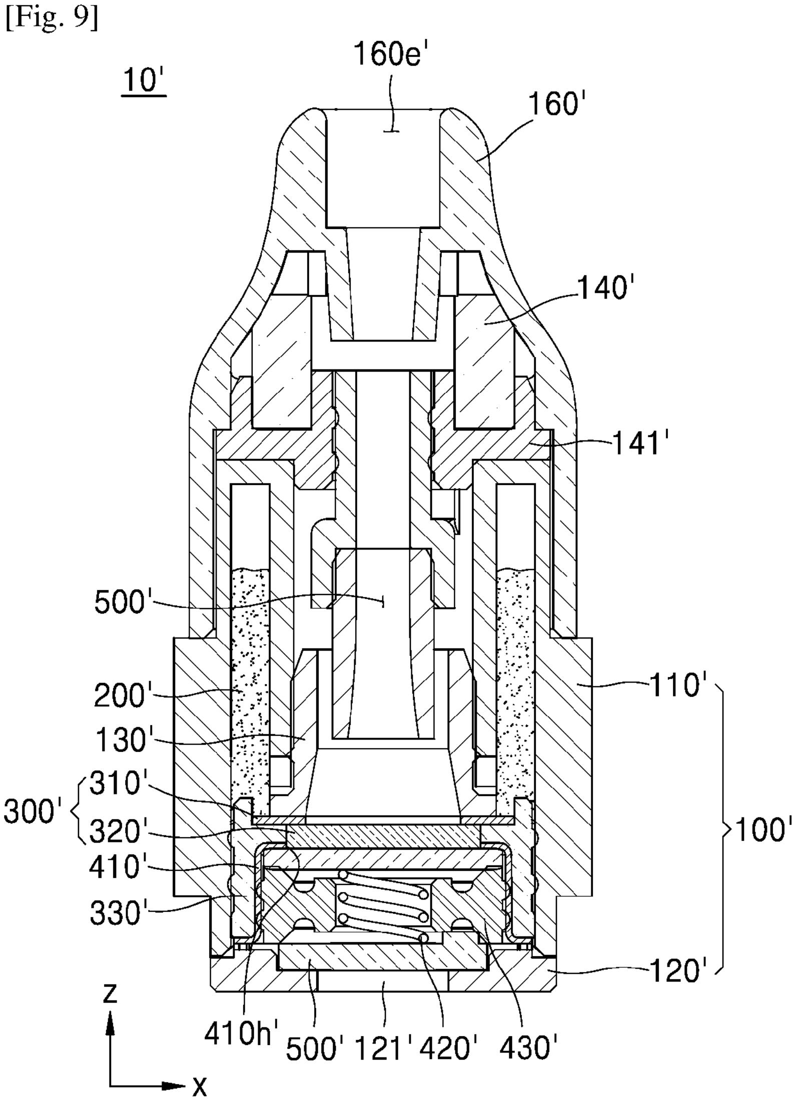

[Fig. 10]
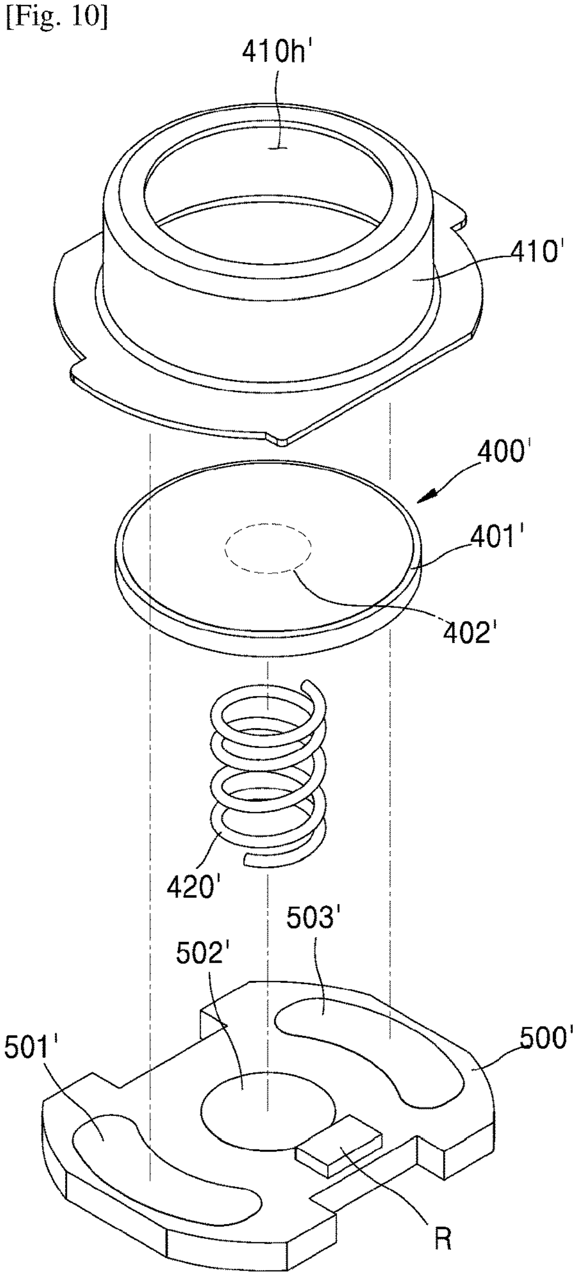
[Fig. 11]
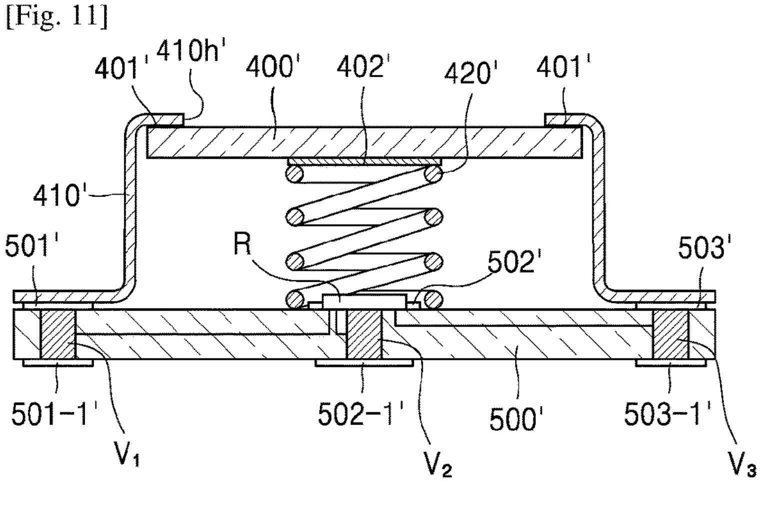

AEROSOL GENERATING DEVICE

CROSS REFERENCE TO RELATED APPLICATIONS

This application is a National Stage of International Application No. PCT/KR2022/011307, filed Aug. 1, 2022, claiming priorities to Korean Patent Application No. 10-2021-0110304, filed Aug. 20, 2021 and Korean Patent Application No. 10-2021-0144964, filed Oct. 27, 2021.

TECHNICAL FIELD

Embodiments of the present disclosure relate to an aerosol generating device, and more particularly, to an aerosol generating device capable of generating an aerosol by using ultrasonic vibrations.

BACKGROUND ART

Recently, there has been a growing demand for technologies for replacing a method of supplying an aerosol by burning a general cigarette. For example, research is being conducted on a method of generating an aerosol from an aerosol generating material in a liquid or solid state, or supplying a flavored aerosol by generating vapor from an aerosol generating material in a liquid state and then passing the generated vapor through a solid fragrance medium.

DISCLOSURE OF INVENTION

Technical Problem

In aerosol generating devices using ultrasonic vibration of the related art, when an alternating-current voltage is supplied to an ultrasonic oscillator, ultrasonic vibrations are generated, and the viscosity of liquid in contact with the ultrasonic oscillator is decreased with heat generated from the ultrasonic oscillator, and then an aerosol is generated by breaking the liquid into small pieces by the ultrasonic vibrations that vibrate at a frequency included in the alternating-current voltage. In this case, atomization performance varies according to a property value of the ultrasonic oscillator.

Heat is generated according to characteristics of the ultrasonic oscillator, and when the generated heat exceeds the Curie temperature, the characteristics of the ultrasonic vibrations may be lost. Accordingly, ensuring the optimal property values of the ultrasonic oscillator is important.

Solution to Problem

According to embodiments of the present disclosure, it is possible to determine a property value of an ultrasonic oscillator capable of generating optimal efficiency, by determining a capacitance value of the ultrasonic oscillator according to a circuit configuration for driving ultrasonic waves.

Technical problems to be solved by embodiments of the present disclosure are not limited to the above-described problems, and problems that are not mentioned will be clearly understood by those of ordinary skill in the art from the present specification and the accompanying drawings.

According to embodiments of the present disclosure, an aerosol generating device includes: a storage configured to store an aerosol generating material; a liquid delivery element configured to absorb the aerosol generating material stored in the storage; and an atomizer configured to atomize the aerosol generating material absorbed by the liquid delivery element into an aerosol by generating ultrasonic vibrations, wherein the atomizer includes an oscillator, and the oscillator has a capacitance value in a range of 0.6 nF to 1.1 nF.

According to one or more embodiments of the present disclosure, a property value of the oscillator is determined based on the range of the capacitance value.

According to one or more embodiments of the present disclosure, the property value of the oscillator includes at least one value from among a piezoelectric constant, an electromechanical coupling coefficient, a mechanical quality factor, a Curie temperature, and an additive.

According to one or more embodiments of the present disclosure, the at least one value includes the additive, and the additive includes at least one of cobalt (Co), antimony (Sb), and niobium (Nb).

According to one or more embodiments of the present disclosure, a thickness of the oscillator is 0.69 mm to 0.71 mm.

According to one or more embodiments of the present disclosure, a diameter of the oscillator is 7 mm to 9 mm.

According to one or more embodiments of the present disclosure, the oscillator includes lead zirconate titanate (PZT).

According to one or more embodiments of the present disclosure, the liquid delivery element includes: a first liquid delivery element arranged adjacent to the storage and configured to receive the aerosol generating material from the storage; and a second liquid delivery element located between the first liquid delivery element and the atomizer, and configured to deliver the aerosol generating material supplied to the first liquid delivery element to the atomizer.

According to one or more embodiments of the present disclosure, the aerosol generating device further includes: a mouthpiece including an outlet for discharging the aerosol to an outside of the aerosol generating device; and a discharge passage configured to connect the atomizer to the outlet, wherein the aerosol moves toward the outlet through the discharge passage.

According to one or more embodiments of the present disclosure, the first liquid delivery element is configured to restrict droplets emitted from the atomizer from moving toward the discharge passage.

According to one or more embodiments of the present disclosure, the aerosol generating device further includes: a battery configured to supply a battery voltage; and a power conversion circuit configured to supply an alternating-current voltage to the oscillator by converting the battery voltage, wherein the capacitance value of the oscillator is determined according to an inductance value of an inductor, of the power conversion circuit, and a resonant frequency of the inductor.

According to one or more embodiments of the present disclosure, the aerosol generating device further includes a processor configured to control the power conversion circuit.

Advantageous Effects of Invention

An aerosol generating device according to the above-described embodiments may determine a property value of an ultrasonic oscillator capable of generating optimal efficiency, by determining a capacitance value of the ultrasonic oscillator according to a circuit configuration for driving ultrasonic waves.

The An aerosol generating device according to the above-described embodiments of the present disclosure may generate an aerosol at a relatively low temperature compared to when a heater is used, by forming an aerosol generating material into fine particles by using ultrasonic vibration, and as a result, a user's feeling of smoking may be improved.

Also, the aerosol generating device according to the above-described embodiments of the present disclosure may prevent droplets emitted from the atomizer in an aerosol atomization process from reaching a user, thereby improving the user's feeling of smoking.

Also, the aerosol generating device according to the above-described embodiments of the present disclosure may prevent leakage of an aerosol generating material, thereby reducing failure or malfunction of the cartridge or the aerosol generating device.

Technical problems to be solved by the embodiments of the present disclosure are not limited to the above-described problems, and problems that are not mentioned will be clearly understood by those of ordinary skill in the art from the present specification and the accompanying drawings.

BRIEF DESCRIPTION OF DRAWINGS

FIG. 1 is a block diagram of an aerosol generating device according to an embodiment.

FIG. 2 is a schematic diagram of the aerosol generating device shown in FIG. 1.

FIG. 3 is a perspective view of a cartridge for an aerosol generating device, according to an embodiment.

FIG. 4 is an exploded perspective view of a cartridge according to an embodiment.

FIG. 5 is a diagram of a driving circuit for driving an aerosol generating device according to an embodiment.

FIG. 6 is a perspective view of a cartridge according to another embodiment.

FIG. 7 is a perspective, exploded view of the cartridge shown in FIG. 6.

FIG. 8 is a cross-sectional view of the cartridge shown in FIG. 6 taken along direction A-A' in FIG. 6.

FIG. 9 is a cross-sectional view of the cartridge shown in FIG. 6 taken along direction B-B' in FIG. 6.

FIG. 10 is an exploded perspective view for describing an electrical connection relationship between an oscillator and a printed circuit board of a cartridge, according to another embodiment.

FIG. 11 is a cross-sectional view for describing the electrical connection relationship between the oscillator and the printed circuit board of the cartridge shown in FIG. 10.

MODE FOR THE INVENTION

With respect to the terms used to describe the various embodiments, general terms which are currently and widely used are selected in consideration of functions of structural elements in the various embodiments of the present disclosure. However, meanings of the terms can be according to intention, a judicial precedence, the appearance of new technology, and the like. In addition, in certain cases, there is also a term arbitrarily selected by the applicant, in which case the meaning will be described in detail in the description of one or more embodiments of the present disclosure. Therefore, the terms used to describe the one or more embodiments should be defined based on the meanings of the terms and the general contents of one or more embodiments, rather than simply the names of the terms.

In addition, unless explicitly described to the contrary, the word "comprise" and variations such as "comprises" or "comprising" will be understood to imply the inclusion of stated components but not the exclusion of any other components. In addition, the terms "-er", "-or", and "module" described herein refer to units for processing at least one function and operation and can be implemented by hardware components or software components and combinations thereof.

As used herein, when the expression, such as "at least any one of" precedes arranged components, the expression modifies all components rather than each of the arranged components. For example, the expression "at least one of a, b, and c" indicates only a, only b, only c, both a and b, both a and c, both b and c, all of a, b, and c, or variations thereof.

In the disclosure, the term "aerosol" may refer to a gas in a state in which vaporized particles generated from an aerosol generating material and air are mixed.

In the disclosure, the term "aerosol generating device" may be a device that generates aerosols by using an aerosol generating material to generate aerosols that may be directly inhaled into a user's lungs through the user's mouth.

In the disclosure, the term "puff" may refer to a user's inhalation, and the inhalation may mean a situation in which aerosols are drawn to the user's oral cavity, nasal cavity, or lungs through the user's mouth or nose.

Hereinafter, embodiments of the present disclosure will be described more fully with reference to the accompanying drawings, in which embodiments of the present disclosure are shown such that those of ordinary skill in the art may easily work the present disclosure. However, the disclosure can be embodied in many different forms and should not be construed as being limited to the example embodiments set forth herein.

FIG. 1 is a block diagram of an aerosol generating device according to an embodiment.

Referring to FIG. 1, an aerosol generating device 1000 may include a battery 510, an atomizer 400, a sensor 520, a user interface 530, a memory 540, and a processor 550. However, the internal structure of the aerosol generating device 1000 is not limited to the structure shown in FIG. 1. According to the design of the aerosol generating device 1000, it will be understood by those of ordinary skill in the art that some of the hardware components shown in FIG. 1 may be omitted or new components may be added.

In an embodiment, the aerosol generating device 1000 may include a main body, and in this case, hardware components included in the aerosol generating device 1000 are located in the main body.

In another embodiment, the aerosol generating device 1000 may include a main body and a cartridge, and hardware components included in the aerosol generating device 1000 may be located separately in the main body and the cartridge. Alternatively, at least some of hardware components included in the aerosol generating device 1000 may be located in the main body and the cartridge, respectively.

Hereinafter, an operation of each component will be described without limiting a space in which each component may be included in the aerosol generating device 1000.

An atomizer 400 receives electric power from a battery 510 under the control by a processor 550. The atomizer 400 may receive electric power from the battery 510 to atomize an aerosol generating material stored in the aerosol generating device 1000.

The atomizer 400 may be located in a main body of the aerosol generating device 1000. Alternatively, when the aerosol generating device 1000 includes a main body and a cartridge, the atomizer 400 may be located in the cartridge or may be separately located in the main body and the cartridge. When the atomizer 400 is located in the cartridge, the atomizer 400 may receive electric power from the battery 510 located in at least one of the main body and the cartridge. Also, when the atomizer 400 is separately located in the main body and the cartridge, components that require electric power in the atomizer 400 may receive electric power from the battery 510 located in at least one of the main body and the cartridge.

The atomizer 400 generates an aerosol from an aerosol generating material inside the cartridge. The aerosol refer to a floating matter in which liquid and/or solid fine particles are dispersed in a gas. Therefore, an aerosol generated from the atomizer 400 may refer to a state in which vaporized particles generated from an aerosol generating material and air are mixed. For example, the atomizer 400 may convert a phase of an aerosol generating material into a gaseous phase through vaporization and/or sublimation. Also, the atomizer 400 may generate an aerosol by forming an aerosol generating material in a liquid and/or solid phase into fine particles and discharging the fine articles.

For example, the atomizer 400 may generate an aerosol from an aerosol generating material by using an ultrasonic vibration method. The ultrasonic vibration method may refer to a method of generating an aerosol by atomizing an aerosol generating material with ultrasonic vibration generated by an oscillator.

Although not shown in FIG. 1, the atomizer 400 may selectively include a heater that may heat an aerosol generating material by generating heat. The aerosol generating material may be heated by the heater, resulting in generating an aerosol.

The heater may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but embodiments are not limited thereto. In addition, the heater may be implemented by a metal wire, a metal plate on which an electrically conductive track is arranged, a ceramic heating element, or the like, but embodiments are not limited thereto.

For example, in an embodiment, the heater may be a part of a cartridge. In addition, the cartridge may include a liquid delivery element and a liquid storage to be described below. An aerosol generating material accommodated in the liquid storage may be moved to the liquid delivery element, and the heater may heat the aerosol generating material absorbed by the liquid delivery element, thereby generating an aerosol. For example, the heater may be wound around the liquid delivery element or arranged adjacent to the liquid delivery element.

In another embodiment, the aerosol generating device 1000 may include an accommodation space that may accommodate a cigarette, and the heater may heat the cigarette inserted into the accommodation space of the aerosol generating device 1000.

As the cigarette is accommodated in the accommodation space of the aerosol generating device 1000, the heater may be located inside and/or outside the cigarette. Accordingly, the heater may generate an aerosol by heating an aerosol generating material in the cigarette.

The heater may be an induction heater. The heater may include an electrically conductive coil for heating a cigarette or a cartridge in an induction heating method, and the cigarette or the cartridge may include a susceptor which may be heated by the induction heater.

The battery 510 supplies electric power used for the aerosol generating device 1000 to operate. In other words, the battery 510 may supply electric power so that the atomizer 400 may atomize an aerosol generating material. In addition, the battery 510 may supply electric power for operations of other hardware components included in the aerosol generating device 1000, that is, at least one sensor 520, a user interface 530, a memory 540, and the processor 550. The battery 510 may be a rechargeable battery or a disposable battery.

For example, the battery 510 may include a nickel-based battery (e.g., a nickel-metal hydride battery, and a nickel-cadmium battery) or a lithium-based battery (e.g., a lithium-cobalt battery, a lithium-phosphate battery, a lithium-titanate battery, a lithium-ion battery, or a lithium-polymer battery). However, a type of the battery 510 which may be used in the aerosol generating device 1000 is not limited thereto. According to embodiments, the battery 510 may include an alkaline battery or a manganese battery.

The aerosol generating device 1000 may include at least one sensor 520. A result sensed by the at least one sensor 520 may be transmitted to the processor 550, and the processor 550 may control the aerosol generating device 1000 to perform various functions, such as controlling an operation of the atomizer 400, restricting smoking, determining whether a cartridge (or a cigarette) is inserted, displaying a notification, or the like, according to the sensed result.

For example, the at least one sensor 520 may include a puff detection sensor. The puff detection sensor may sense a user's puff based on at least one of a flow change of an airflow introduced from the outside, a pressure change, and detecting of sound. The puff detection sensor may detect a start timing and an end timing of a user's puff, and the processor 550 may determine a puff period and a non-puff period according to the detected start timing and the end timing of the puff.

In addition, the at least one sensor 520 may include a user input sensor. The user input sensor may be a sensor that may receive a user's input, such as a switch, a physical button, a touch sensor, or the like. For example, the touch sensor may be a capacitive sensor that may detect the user's input by detecting a change in capacitance that occurs when a user touches a certain area formed of a metallic material. The processor 550 may determine whether the user's input has occurred by comparing values before and after the change in capacitance received from the capacitive sensor. When the values before and after the change in capacitance is greater than a preset threshold value, the processor 550 may determine that the user's input has occurred. In addition, the at least one sensor 520 may include a motion sensor. Information about a movement of the aerosol generating device 1000, such as an inclination, movement speed, acceleration, or the like of the aerosol generating device 1000, may be obtained through the motion sensor. For example, the motion sensor may measure information about a state in which the aerosol generating device 1000 moves, a stationary state of the aerosol generating device 1000, a state in which the aerosol generating device 1000 is inclined at an angle with a certain range for a puff, and a state in which the aerosol generating device 1000 is inclined at an angle different from that during puff operation between each puff operation. The motion sensor may measure motion information of the aerosol generating device 1000 by using various methods known in the art. For example, the motion sensor may include an acceleration sensor capable of measuring acceleration in three directions of x-axis, y-axis, and z-axis, and a gyro sensor capable of measuring an angular speed in three directions.

In addition, the at least one sensor 520 may include a proximity sensor. The proximity sensor refers to a sensor that detects the presence or distance of an approaching object or an object in the vicinity by using a force of an electromagnetic field, infrared light, or the like, without mechanical contact. Accordingly, it is possible to detect whether a user is approaching the aerosol generating device 1000.

In addition, the at least one sensor 520 may include an image sensor. The image sensor may include, for example, a camera for obtaining an image of an object. The image sensor may recognize an object based on an image obtained by the camera. The processor 550 may determine whether a user is in a situation for using the aerosol generating device 1000 by analyzing the image obtained through the image sensor. For example, when the user makes the aerosol generating device 1000 approach near his/her lips to use the aerosol generating device 1000, the image sensor may obtain an image of the lips. The processor 550 may analyze the obtained image and determine that it is a situation for the user to use the aerosol generating device 1000 when the obtained image is determined to include lips. Accordingly, the aerosol generating device 1000 may operate atomizer 400 in advance, or may preheat the heater.

In addition, the at least one sensor 520 may include a consumable attachment and detachment sensor which may detect the mounting or removal of a consumable (e.g., a cartridge, a cigarette, or the like) that may be used in the aerosol generating device 1000. For example, the consumable attachment and detachment sensor may be an image sensor that detects whether the consumable has contacted the aerosol generating device 1000, or determines whether the consumable is mounted or removed. In addition, the consumable attachment and detachment sensor may be an inductance sensor that detects a change in an inductance value of a coil which may interact with a marker of a consumable, or a capacitance sensor that detects a change in a capacitance value of a capacitor which may interact with a marker of a consumable.

In addition, the at least one sensor 520 may include a temperature sensor. The temperature sensor may detect a temperature at which the heater (or an aerosol generating material) of the atomizer 400 is heated. The aerosol generating device 1000 may include a separate temperature sensor that detects a temperature of the heater, or the heater itself may serve as a temperature sensor instead of including a separate temperature sensor. Alternatively, a separate temperature sensor may be further included in the aerosol generating device 1000 while the heater serves as a temperature sensor. In addition, the temperature sensor may detect not only the temperature of the heater but also the temperature of internal components such as a printed circuit board (PCB), a battery, or the like of the aerosol generating device 1000.

In addition, the at least one sensor 520 may include various sensors that measure information about a surrounding environment of the aerosol generating device 1000. For example, the at least one sensor 520 may include a temperature sensor that may measure a temperature of a surrounding environment, a humidity sensor that measures a humidity of a surrounding environment, an atmospheric pressure sensor that measures a pressure of a surrounding environment, or the like.

The at least one sensor 520 that may be provided in the aerosol generating device 1000 is not limited to the above-stated types, and may further include various other sensors. For example, the aerosol generating device 1000 may include a fingerprint sensor that may obtain fingerprint information from a user's finger for user authentication and security, an iris recognition sensor that analyzes an iris pattern of a pupil, a vein recognition sensor that detects absorption of infrared rays of reduced hemoglobin in veins from an image of a palm, a face recognition sensor that recognizes feature points, such as eyes, nose, mouth, facial contours, or the like in a two-dimensional (2D) or three-dimensional (3D) method, a radio-frequency identification (RFID) sensor, or the like.

According to some embodiments of the present disclosure, one or more of the examples of the above-described various types of the at least one sensor 520 may be selectively implemented in the aerosol generating device 1000. In other words, the aerosol generating device 1000 may combine and utilize information sensed by at least one of the above-described sensors.

The user interface 530 may provide a user with information about a state of the aerosol generating device 1000. The user interface 530 may include various interfacing elements, such as a display or a lamp for outputting visual information, a motor for outputting haptic information, a speaker for outputting sound information, input/output (I/O) interfacing elements (e.g., a button or a touch screen) for receiving information input from the user or outputting information to the user, terminals for performing data communication or receiving charging power, and communication interfacing modules for performing wireless communication (e.g., Wi-Fi, Wi-Fi direct, Bluetooth, nearfield communication (NFC), etc.) with external devices.

According to embodiments of the present disclosure, one or more of the examples of the above-described types of the user interface 530 may be selectively implemented in the aerosol generating device 1000.

The memory 540 is hardware that stores various pieces of data processed in the aerosol generating device 1000, and the memory 540 may store data processed or to be processed by the processor 550. The memory 540 may include various types of memories, such as random access memory (RAM), such as dynamic random access memory (DRAM), static random access memory (SRAM), etc., read-only memory (ROM), electrically erasable programmable read-only memory (EEPROM), and the like.

The memory 540 may store an operation time of the aerosol generating device 1000, the maximum number of puffs, the current number of puffs, at least one temperature profile, data on a user's smoking pattern, and the like.

The processor 550 controls overall operations of the aerosol generating device 1000. The processor 550 may be implemented as an array of a plurality of logic gates or may be implemented as a combination of a general-purpose microprocessor and a memory in which a program executable in the microprocessor is stored. According to embodiments of the present disclosure, the program, when executed by the microprocessor, may be configured to cause the microprocessor to perform any number of functions of the processors (e.g., the processor 550) described in the present disclosure. In addition, it will be understood by those of ordinary skill in the art that the processor 550 may be implemented in other forms of hardware.

The processor 550 analyzes a result sensed by the at least one sensor 520, and controls processes that are to be performed subsequently.

The processor 550 may control electric power supplied to the atomizer 400 so that the operation of the atomizer 400 is started or terminated, based on the result sensed by the at least one sensor 520. In addition, based on the result sensed by the at least one sensor 520, the processor 550 may control the amount of electric power supplied to the atomizer 400 and the time at which the electric power is supplied, so that the atomizer 400 may generate the appropriate amount of aerosols. For example, the processor 550 may control a current supplied to an oscillator so that the oscillator of the atomizer 400 may vibrate at a certain frequency.

In an embodiment, the processor 550 may start the operation of the atomizer 400 after receiving a user input for the aerosol generating device 1000. In addition, the processor 550 may start the operation of the atomizer 400 after detecting a user's puff by using a puff detection sensor. In addition, the processor 550 may stop supplying electric power to the atomizer 400 when the number of puffs reaches a preset number after counting the number of puffs by using the puff detection sensor.

The processor 550 may control the user interface 530 based on a result sensed by the at least one sensor 520. For example, when the number of puffs reaches a preset number after counting the number of puffs by using the puff detection sensor, the processor 550 may notify the user by using at least one of a lamp, a motor, and a speaker that the aerosol generating device 1000 will soon be terminated.

Although not illustrated in FIG. 1, the aerosol generating device 1000 and a separate cradle may be included in an aerosol generating system. For example, the cradle may be used to charge the battery 510 of the aerosol generating device 1000. For example, the aerosol generating device 1000 may receive electric power from a battery of the cradle to charge the battery 510 of the aerosol generating device 1000 while being accommodated in an accommodation space of the cradle.

FIG. 2 is a schematic diagram of an aerosol generating device according to an embodiment.

The aerosol generating device 1000 according to an embodiment shown in FIG. 2 includes a cartridge 10 containing an aerosol generating material, and a main body 20 supporting the cartridge 10.

The cartridge 10 may be coupled to the main body 20 in a state in which the aerosol generating material is accommodated therein. For example, at least a portion of the cartridge 10 is inserted into the main body 20, and thus, the cartridge 10 and the main body 20 may be coupled to each other. As another example, at least a portion of the main body 20 is inserted into the cartridge 10, and thus, the cartridge 10 and the main body 20 may be coupled to each other.

The cartridge 10 and the main body 20 may be coupled by at least one of a snap-fit method, a screw coupling method, a magnetic coupling method, and an interference fit method, but a method of coupling the cartridge 10 to the main body 20 is not limited to the above-state methods.

In an embodiment, the cartridge 10 may include a mouthpiece 160 that is inserted into a user's oral cavity during a process of the user's inhalation. In an embodiment, the mouthpiece 160 may be arranged in one area of the cartridge 10 opposite to another area of the cartridge 10, wherein the other area of the cartridge 10 is coupled to the main body 20, and may include an outlet 160*e* that discharges an aerosol generated from the aerosol generating material to the outside.

A pressure difference between the outside and the inside of the cartridge 10 may occur by a user's inhalation or puff action, and an aerosol generated in the cartridge 10 may be discharged to the outside of the cartridge 10 through the outlet 160*e* due to the pressure difference between the outside and the inside of the cartridge 10. In other words, the user may receive the aerosol that is discharged to the outside of the cartridge 10 through contacting the oral cavity with the mouthpiece 160 and inhaling.

In an embodiment, the cartridge 10 may include a storage 200 that is located in an internal space of a housing 100 and accommodates the aerosol generating material. In the disclosure, the expression "storage accommodates an aerosol generating material" may be to mean that the storage 200 functions as a container simply holding an aerosol generating material and that the storage 200 includes an element impregnated with (containing) an aerosol generating material, such as a sponge, cotton, fabric, or porous ceramic structure.

The cartridge 10 may contain an aerosol generating material in any one of, for example, a liquid state, a solid state, a gaseous state, and a gel state. The aerosol generating material may include a liquid composition. For example, the liquid composition may be a liquid including a tobacco-containing material having a volatile tobacco flavor component, or a liquid including a non-tobacco material.

The liquid composition may include, for example, one component of water, solvents, ethanol, plant extracts, spices, flavorings, and vitamin mixtures, or a mixture of these components. The spices may include menthol, peppermint, spearmint oil, various fruit-flavored ingredients, or the like, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent, such as glycerin and propylene glycol.

For example, the liquid composition may include any weight ratio of glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for the formation of nicotine salts may be appropriately selected in consideration of the rate of nicotine absorption in the blood, the operating temperature of the aerosol generating device 1000, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The aerosol generating device 1000 may include the atomizer 400 that converts a phase of the aerosol generating material inside the cartridge 10 to generate an aerosol.

In an embodiment, the aerosol generating material that is stored or accommodated in the storage 200 may be supplied to the atomizer 400 by a liquid delivery element 300, and the atomizer 400 may atomize the aerosol generating material supplied from the liquid delivery element 300 to generate an aerosol. The liquid delivery element 300 may be a wick including at least one of, for example, a cotton fiber, a ceramic fiber, a glass fiber, and a porous ceramic, but is not limited thereto.

In an embodiment, the atomizer 400 of the aerosol generating device 1000 may convert the phase of the aerosol generating material by using an ultrasonic vibration method in which an aerosol generating material is atomized with ultrasonic vibration.

For example, the atomizer 400 may include an oscillator that generates short-period vibration, and the vibration generated from the oscillator may be ultrasonic vibration. A frequency of the ultrasonic vibration may be about 100 kilohertzs (kHz) to about 3.5 megahertzs (MHz), but is not limited thereto.

An ultrasonic oscillator may have a capacitance value of about 0.6 nanoferrites (nF) to about 1.1 nF. In an embodiment, the ultrasonic oscillator is in the form of an electrode having various shapes and sizes, and has a capacitance value. In order to provide alternating-current power to the ultrasonic oscillator, electric power is provided through an inductor coupled power switch to supply alternating-current power to an electrode of the oscillator, thereby generating ultrasonic vibration.

In an embodiment, a capacitance value of the ultrasonic oscillator or a range of the capacitance value may be determined based on a resonant frequency of a power conversion circuit and an inductance value of an inductor. For example, when the resonant frequency of the circuit or a frequency (f) set by a system is 3 MHz and an inductance value (L) of the inductor is 4.7 microhenrys (μH), a capacitance value (C) may be determined as 0.6 nF according to the following Equation 1.

$$f = \frac{1}{2\pi\sqrt{LC}} \qquad \text{[Equation 1]}$$

Also, a property value of the oscillator may be determined based on the capacitance value of the oscillator or within a range of the capacitance value. Here, the property value of the oscillator may include a piezoelectric constant, an electromechanical coupling coefficient, a mechanical quality factor, Curie temperature, and an additive, and the additive may include cobalt (Co), antimony (Sb), niobium (Nb), and the like.

Heat is generated in the oscillator according to the property value of the oscillator, and when the heat exceeds the Curie temperature, characteristics of the ultrasonic vibration are lost. Therefore, ensuring and reflecting the optimal property values of the ultrasonic oscillator is an important issue. In an embodiment, after the capacitance value of the oscillator or the range of the capacitance value is determined, the property value of the ultrasonic oscillator having such value is determined.

The piezoelectric constant is a constant indicating a displacement degree when an alternating-current voltage is supplied to an oscillator. When an electric field (V/m) is applied to a piezoelectric material, d33, d31, d15, or the like may be expressed as a coefficient indicating a displacement degree by an electric field direction and a displacement direction. The unit of the piezoelectric constant may be expressed as [m/V]. The ultrasonic oscillator of the aerosol generating device according to an embodiment may have a piezoelectric constant of d33 (piezoelectric constant, 10-12 m/V). Here, when a value of the piezoelectric constant increases, piezoelectric characteristics (vibration amount) increases, and as a result, an atomization amount of the aerosol generating device increases.

The electromechanical coupling coefficient (%) is a coefficient indicating conversion efficiency between electrical energy and mechanical energy. The higher the value, the better the performance. An electromechanical coupling coefficient (K) may be calculated according to the following Equation 2.

$$K = (\text{Electrical energy converted into mechanical energy}) / (\text{imput electrical energy}) \qquad \text{[Equation 2]}$$

The electromechanical coupling coefficient may be expressed as k33, k31, k15, kp, or kt according to a vibration mode.

A mechanical quality factor (Qm) represents a reciprocal of mechanical loss that occurs inside a specimen during energy conversion, represents the loss of an oscillator or a piezoelectric material, and is a value indicating the degree of sharpness of mechanical vibration at a resonant frequency of a piezoelectric oscillator. The mechanical quality factor may be calculated as in the following Equation 3.

$$Qm = \frac{fa^2}{2\pi frZrC(fa^2 - fr^2)} \qquad \text{[Equation 3]}$$

Here, $f_r$ is a resonant frequency, $f_a$ is an antiresonant frequency, $Z_r$ is a resonant impedance, and C is a capacitance value. The higher the mechanical quality factor (Qm), the higher the rigidity and durability. The smaller the resonant impedance decreases and the smaller the capacitance value, the higher the mechanical quality factor. The lower the ε33 (dielectric constant), the lower the heat generation performance. A temperature increase graph of an oscillator may be adjusted by adjusting the dielectric constant value. The Curie temperature is a temperature at which characteristics (impedance and frequency) of an oscillator are changed.

When the additive, cobalt (Co), is added, the loss is reduced. Therefore, a piezoelectric constant or piezoelectric performance (d33) is increased. When the additive, antimony (Sb) or niobium (Nb), is added, the mechanical quality factor (Qm) is increased, and thus, the rigidity of an oscillator is increased.

The Curie temperature refers to a temperature at which characteristics of an oscillator, for example, impedance and frequency, are changed. The relation between a resonant frequency and heat generation of an oscillator has a minimum resonant impedance at the resonant frequency Fr. Therefore, when the oscillator is operated at the resonant frequency, the efficiency is maximized. When the resonant frequency is passed, the impedance increases, and heat is generated due to the increase in the impedance. The increase in the impedance refers to an increase in a capacitance value, and the capacitance value is maximum at the Curie temperature.

In an embodiment, a property value of the oscillator may be determined based on a capacitance value of the oscillator or within a range of the capacitance value. As described above, a piezoelectric constant, an electromechanical coupling coefficient, a mechanical quality factor, Curie temperature, an additive, or the like may be adjusted or determined according to the capacitance value or within a range of the value.

In an embodiment, a thickness of the oscillator may be about 0.69 mm to about 0.71 mm, and a diameter of the oscillator may be about 7 mm to about 9 mm. The shape of the oscillator may be a disk shape, a rectangular plate shape, or a ring shape, but is not limited thereto, and the shape may be variously modified according to the application or design of the aerosol generating device. In addition, the oscillator may have a certain thickness and a certain area, which are factors that determine a capacitance value.

An aerosol generating material supplied from the storage 200 to the atomizer 400 may be vaporized and/or formed into particles to be atomized into an aerosol by short-period vibration generated from the oscillator.

The oscillator may include, for example, a piezoelectric ceramic, and the piezoelectric ceramic may be a functional material capable of interconverting electricity and a mechanical force by generating electricity (voltage) by a physical force (pressure) and conversely generating vibration (mechanical force) when electricity is applied. In other words, as electricity is applied to the oscillator, short-period vibration (physical force) may be generated, and the generated vibration may atomize an aerosol generating material into an aerosol by splitting the aerosol generating material into small particles.

The oscillator may be electrically connected to other components of the aerosol generating device 1000 through an electrical connection member. For example, the oscillator may be electrically connected to at least one of the battery 510 and the processor 550 of the aerosol generating device 1000 through an electrical connection member, but the component that is electrically connected to the oscillator is not limited to the above-described examples.

The oscillator may receive current or voltage from the battery 510 through an electrical connection member to generate ultrasonic vibration, or an operation of the oscillator may be controlled by the processor 550.

The electrical connection member may include, for example, at least one of a pogo pin and a C-clip, but is not limited to the above-described examples. As another example, the electrical connection member may include at least one of a cable and a flexible printed circuit board (FPCB).

In another embodiment (not shown), the atomizer 400 may also be implemented into a mesh- or plate-shaped vibration receiver that performs both a function of maintaining an aerosol generating material in an optimal state for converting the aerosol generating material into an aerosol by absorbing the aerosol generating material without using a separate liquid delivery element 300, and a function of generating an aerosol by delivering vibration to an aerosol generating material.

In FIG. 2, the embodiment in which the liquid delivery element 300 and the atomizer 400 are arranged in the cartridge 10 is shown, but the arrangement structure of the liquid delivery element 300 and the atomizer 400 is not limited to the embodiment. In another embodiment, the liquid delivery element 300 may be arranged in the cartridge 10, and the atomizer 400 may be arranged in the main body 20.

The cartridge 10 of the aerosol generating device 1000 may include a discharge passage 150. The discharge passage 150 is arranged in the cartridge 10, and may be connected to or communicate with the atomizer 400 and the outlet **160*e* of the mouthpiece 160. Accordingly, an aerosol generated from the atomizer 400 may flow through the discharge passage 150, and may be discharged to the outside of the aerosol generating device 1000 through the outlet 160*e*** and delivered to a user.

For example, the discharge passage 150 may be arranged to be surrounded by the storage 200 in the cartridge 10, but embodiments are not limited thereto.

Although not shown, the cartridge 10 of the aerosol generating device 1000 may include at least one air inlet passage for introducing air located outside of the aerosol generating device 1000 (hereinafter, referred to as "external air") into the aerosol generating device 1000.

The external air may be introduced into a space in which an aerosol is generated by the discharge passage 150 or the atomizer 400 in the cartridge 10 through at least one air inlet passage. The introduced external air may be mixed with a vaporized particle generated from an aerosol generating material, and as a result, an aerosol may be generated.

The cross-sectional shape of the aerosol generating device 1000, in a direction traverse to a longitudinal direction of the cartridge 10 and the main body 20, may be approximately a circle, an oval, a square, a rectangular, or a polygon of various shapes. However, the cross-sectional shape of the aerosol generating device 1000 is not limited thereto, and when the aerosol generating device 1000 extends in the longitudinal direction, the aerosol generating device 1000 may not be formed in a linearly extending structure.

In another embodiment, the cross-sectional shape of the aerosol generating device 1000 may be curved in a streamlined shape so that a user easily holds the aerosol generating device 1000 by hand or may be bent at a predetermined angle in a specific area and extend lengthwise, and the cross-sectional shape of the aerosol generating device 1000 may change according to the longitudinal direction.

FIG. 3 is a perspective view of a cartridge for an aerosol generating device, according to an embodiment, and FIG. 4 is an exploded perspective view of a cartridge according to an embodiment.

FIGS. 3 and 4 may be an embodiment of the cartridge 10 applied to the aerosol generating device 1000 shown in FIG. 2, and hereinafter, redundant descriptions will be omitted.

Referring to FIGS. 3 and 4, the cartridge 10 according to an embodiment may include the housing 100 forming the overall appearance of the cartridge 10, and the mouthpiece 160 connected to an area of the housing 100.

The components of the cartridge 10 according to an embodiment are not limited to the above-described examples, and at least one component may be added or any one component (e.g., the mouthpiece 160) may be omitted according to an embodiment.

The housing 100 may include an internal space in which the components of the cartridge 10 may be arranged, and may form the overall appearance of the cartridge 10. In FIGS. 3 and 4, an embodiment in which the housing 100 has a cylindrical shape as a whole is shown, but the shape of the housing 100 is not limited thereto. In another embodiment (not shown), the housing 100 may be formed in the shape of a polygonal pole (e.g., a triangular pole and a quadrangular pole) as a whole.

In an embodiment, the housing 100 may include a first housing 110 and a second housing 120 connected to an area of the first housing 110, and the first housing 110 and the second housing 120 may protect the components of the cartridge 10, which are arranged in an internal space formed by a combination of the first housing 110 and the second housing 120.

For example, the second housing 120 (or "lower housing") may be coupled to an area located at the bottom (e.g., −z direction) of the first housing 110 (or "upper housing"), but embodiments are not limited thereto.

In the disclosure, the expression "bottom of the first housing" may refer to the −z direction of the first housing 110, the expression "top of the first housing" may refer to a z direction of the first housing 110, and these expressions may be used to have the same meanings, respectively, hereinafter.

The mouthpiece 160 is a portion inserted into a user's oral cavity, and may be connected to an area of the housing 100. For example, the mouthpiece 160 may be connected to one area (e.g., an upper area of the first housing 110) of the first housing 110 opposite to another area of the first housing 110, wherein the other area of the first housing 110 is connected to the second housing 120.

In an embodiment, the mouthpiece 160 may be detachably/attachably coupled to an area of the housing 100, but the mouthpiece 160 and the housing 100 may be integrally formed according to an embodiment.

The mouthpiece 160 may include at least one outlet 160*e* for discharging an aerosol generated in the cartridge 10 to the outside of the cartridge 10. A user may contact his/her oral cavity to the mouthpiece 160 and receive an aerosol discharged to the outside through the outlet 160*e* of the mouthpiece 160.

The cartridge 10 may include a storage 200 (e.g., the storage 200 in FIG. 2) arranged in the internal space of the housing 100, a liquid delivery element 300 (e.g., the liquid delivery element 300 in FIG. 2), and an atomizer 400 (e.g., the atomizer 400 in FIG. 2).

In an embodiment, the storage 200 may be located in the first housing 110, and the storage 200 may store an aerosol generating material. For example, the storage 200 may store a liquid aerosol generating material, and the liquid aerosol generating material stored in the storage 200 may be delivered to the atomizer 400 by the liquid delivery element 300.

In an embodiment, the liquid delivery element 300 may receive an aerosol generating material from the storage 200 and deliver the received aerosol generating material to the atomizer 400. For example, the liquid delivery element 300 may absorb an aerosol generating material that moves toward the liquid delivery element 300 from the storage 200, and the absorbed aerosol generating material may move along the liquid delivery element 300 and may be supplied to the atomizer 400.

In an embodiment, the liquid delivery element 300 may include a plurality of liquid delivery elements. For example, the liquid delivery element 300 may include a first liquid delivery element 310 and a second liquid delivery element 320.

The first liquid delivery element 310 is arranged adjacent to the storage 200, and thus may receive a liquid aerosol generating material from the storage 200. For example, the first liquid delivery element 310 may receive an aerosol generating material from the storage 200 by absorbing at least some of aerosol generating materials discharged from the storage 200.

The second liquid delivery element 320 is located between the first liquid delivery element 310 and the atomizer 400, and may deliver, to the atomizer 400, an aerosol supplied to the first liquid delivery element 310.

For example, one area of the first liquid delivery element 310 opposite to another area of the first liquid delivery element 310, wherein the other area of the first liquid delivery element 310 faces the storage 200, may be in contact with an area of the second liquid delivery element 320, the area facing the first liquid delivery element 310. As another example, one area of the second liquid delivery element 320 opposite to other area of the second liquid delivery element 320 may be in contact with an area of the atomizer 400.

In other words, the atomizer 400, the second liquid delivery element 320, and the first liquid delivery element 310 may be sequentially arranged in a longitudinal direction (e.g., z direction) of the cartridge 10 or the housing 100, and as a result, the second liquid delivery element 320 and the first liquid delivery element 310 may be sequentially stacked on the atomizer 400.

Through the above-described arrangement structure, at least some of aerosol generating materials supplied from the storage 200 to the first liquid delivery element 310 may move to the second liquid delivery element 320 in contact with the first liquid delivery element 310. Also, an aerosol generating material that has moved to the second liquid delivery element 320 may move along the second liquid delivery element 320 and reach the atomizer 400 in contact with the second liquid delivery element 320.

In FIGS. 3 and 4, the embodiment in which the liquid delivery element 300 consists of two liquid delivery elements is shown, but in an embodiment, the liquid delivery element 300 may include one liquid delivery element or three or more liquid delivery elements.

In an embodiment, the atomizer 400 may atomize an aerosol generating material supplied from the liquid delivery element 300, thereby generating an aerosol.

For example, the atomizer 400 may include an oscillator that generates ultrasonic vibration. A frequency of the ultrasonic vibration generated by the oscillator may be about 100 kHz to about 10 MHZ, for example, about 100 kHz to about 3.5 MHz. The oscillator may vibrate in the longitudinal direction (or "vertical direction") of the cartridge 10 or the housing 100 due to the above-described frequency band.

The atomizer 400 may atomize an aerosol generating material by an ultrasonic method, thereby generating an aerosol at a relatively low temperature compared to a method of heating an aerosol generating material. For example, when an aerosol generating material is heated by using a heater, the aerosol generating material may be unintentionally heated to a temperature of 200° C. or more, and thus, a user may feel a burnt taste in an aerosol.

In contrast, by atomizing an aerosol generating material by the ultrasonic method, the cartridge 10 according to an embodiment may generate an aerosol in a temperature range of about 100° C. to about 160° C., which is a lower temperature than when an aerosol generating material is heated by using a heater. Accordingly, the cartridge 10 may minimize the feeling of a burnt taste in an aerosol, thereby improving a user's feeling of smoking.

In an embodiment, air outside the cartridge 10 (hereinafter, referred to as "external air") may be introduced into the cartridge 10 through an air inlet 130*i* located in an area of the housing 100.

An aerosol introduced into the housing 100 through the air inlet 130*i* may reach the atomizer 400 by flowing through an air inlet passage (not shown) via which the air inlet 130*i* is connected to or communicate with the atomizer 400, and external air that has reached the atomizer 400 may be mixed with a vaporized particle generated from the atomizer 400 to form an aerosol.

The aerosol formed by mixing the external air with the particle generated from the atomizer 400 may flow through a discharge passage (e.g., the discharge passage 150 in FIG.

2) and may be discharged to the outside of the cartridge 10 through the outlet 160*e* of the mouthpiece 160 and supplied to a user. A detailed description of a flow direction of the aerosol will be described below.

The cartridge 10 according to an embodiment may further include a structure 140 for preventing droplets emitted from the atomizer 400 from being supplied to a user, and a first support member 141 that fixes or supports the structure 140.

During a process in which aerosol generating materials are atomized by ultrasonic vibration generated from the atomizer 400, some aerosol generating materials may not be atomized, resulting in the formation of droplets, and the droplets may be emitted by the ultrasonic vibration generated from the atomizer 400 and discharged to the outside of the cartridge 10 through the outlet 160*c*.

The structure 140 is arranged adjacent to the discharge passage 150, and thus may restrict emitted droplets from moving and flowing toward the outlet 160*e* of the mouthpiece 160.

For example, the structure 140 may absorb droplets emitted from the atomizer 400 by including a material (e.g., felt material) capable of absorbing droplets, thereby restricting the droplets from moving or flowing toward the outlet 160*e*, but embodiments are not limited thereto.

When droplets emitted from the atomizer 400 are discharged to the outside of the cartridge 10 through the outlet 160*e* and delivered to a user, the user may feel uncomfortable, and thus, the overall feeling of smoking may be reduced. In the disclosure, the expression "feeling of smoking" may refer to a sensation that a user experiences during a smoking process, and the expression may be used to have the same meaning hereinafter.

In contrast, through the structure 140, the cartridge 10 according to an embodiment may restrict droplets that are not atomized and emitted from the atomizer 400 from moving toward the outlet 160*e*, thereby reducing the reduction of a user's feeling of smoking due to the emission of the droplets. In the disclosure, the expression "emission of droplets" may be to mean that droplets that are not atomized are emitted and then delivered to a user, and the expression may be used to have the same meaning hereinafter.

The first support member 141 may accommodate at least an area of the structure 140 and hold the accommodated structure 140 in an area of the first housing 110. For example, the first support member 141 may hold or fix the structure 140 in or to an area (e.g., an upper area) of the first housing 110, wherein the area is adjacent to the mouthpiece 160, but embodiments are not limited thereto.

In an embodiment, the first support member 141 may be arranged to surround at least an area of the structure 140 to accommodate the structure 140, and as the first support member 141 accommodating the structure 140 is coupled to an area of the first housing 110, the structure 140 may be fixed to the area of the first housing 110.

The first support member 141, accommodating the structure 140, and the first housing 110 may be coupled in such a manner that at least a portion of the first support member 141 is interference-fitted to the first housing 110, but a method of coupling the first housing 110 to the first support member 141 is not limited to the above-described example. In another example, the first housing 110 and the first support member 141 may also be coupled by at least one of a snap-fit method, a screw coupling method, and a magnetic coupling method.

The first support member 141 may include a material (for example, rubber) having a certain rigidity and waterproofness, thereby not only fixing the structure 140 to the first housing 110, but also preventing leakage of aerosol generating materials from the storage 200. For example, the first support member 141 may block an area of the storage 200, the area facing the mouthpiece 160, thereby preventing leakage of aerosol generating materials.

The cartridge 10 according to an embodiment may further include a second support member 340 for holding the liquid delivery element 300 and/or the atomizer 400 inside the first housing 110.

The second support member 340 may be arranged to surround at least a portion of an outer circumferential surface of the first liquid delivery element 310, the second liquid delivery element 320, and/or the atomizer 400 to accommodate the first liquid delivery element 310, the second liquid delivery element 320, and/or the atomizer 400. The second support member 340 accommodating the first liquid delivery element 310, the second liquid delivery element 320, and/or the atomizer 400 may be coupled to another area of the first housing 110, and as a result, the first liquid delivery element 310, the second liquid delivery element 320, and/or the atomizer 400 may be held in or fixed to the other area of the first housing 110.

For example, the second support member 340 may be coupled to one area (e.g., a lower area) of the first housing 110 opposite to another area of the first housing 110, wherein the other area of the first housing 110 is coupled to the first support member 141, but embodiments are not limited thereto.

The second support member 340 and the first housing 110 may be coupled in such a manner that at least a portion of the second support member 340 is interference-fitted to the first housing 110, but a method of coupling the first housing 110 to the second support member 340 is not limited to the above-described example. In another example, the first housing 110 and the second support member 340 may also be coupled by at least one of a snap-fit method, a screw coupling method, and a magnetic coupling method.

The second support member 340 may include a material (e.g., rubber) having a certain rigidity and waterproofness, thereby not only fixing the liquid delivery element 300 and the atomizer 400 to the first housing 110, but also preventing leakage of aerosol generating materials from the storage 200. For example, the second support member 340 may block an area of the storage 200, wherein the area is adjacent to the liquid delivery element 300 or the atomizer 400, thereby preventing leakage of aerosol generating materials.

TABLE 1

| Specifications | | #1 | #2 | #3 | #4 | #5 |
|---|---|---|---|---|---|---|
| Weight change | Before evaluation | 9.458 (g) | 9.545 (g) | 9.384 (g) | 9.371 (g) | 9.420 (g) |
| | After evaluation | 9.758 (g) | 9.904 (g) | 9.698 (g) | 9.683 (g) | 9.738 (g) |
| | Variation | +0.300 (g) | +0.359 (g) | +0.314 (g) | +0.312 (g) | +0.318 (g) |

Table 1, above, is a result of comparing an initial weight (before evaluation) of the cartridge 10 according to an embodiment with a weight (after evaluation) of the cartridge 10 measured after storing the cartridge 10 at a temperature of 60° C. and a humidity of 80% for 96 hours and then leaving the cartridge 10 at room temperature for 2 hours. When leakage occurs from the cartridge 10, at least some of aerosol generating materials leak out of the cartridge 10, and thus, the weight of the cartridge 10 after evaluation is decreased compared to the weight of the cartridge 10 before evaluation.

In contrast, the weight of the cartridge 10 after evaluation was increased by an average of about 0.321 g compared to the weight thereof before evaluation, and it could be confirmed that leakage did not occur from the cartridge 10 according to an embodiment through the result of Table 1.

In this case, moisture that was formed in the process of storing the cartridge 10 at a relatively high humidity (humidity of 80%) and then leaving the cartridge 10 at room temperature may be the reason the weight of the cartridge 10 after evaluation was increased compared to the weight thereof before evaluation in the result of Table 1.

In other words, the cartridge 10 according to an embodiment may prevent leakage of aerosol generating materials from the storage 200 through the first support member 141 and/or the second support member 340, and as a result, failure or malfunction of the cartridge 10 due to leakage may be minimized.

FIG. 5 is a diagram of a driving circuit for driving an aerosol generating device according to an embodiment.

Referring to FIG. 5, a driving circuit includes a battery 510, a DC/DC converter 511, a power driving circuit 512, a processor 550, an inductor, and a voltage boost circuit 513.

The DC/DC converter 511 boosts a battery voltage of the battery 510 to a first voltage. The battery voltage may be about 3.4 V to about 4.2 V, but embodiments are not limited thereto. The battery voltage may be about 3.8 V to about 6 V, or may be about 2.5 V to about 3.6 V. A first voltage V1 may be about 10 V to about 13 V, but embodiments are not limited thereto. The first voltage V1 may be about 7 V to about 10.5 V, or may be about 12 V to about 20 V. In an example, the first voltage may be at least three times the battery voltage. However, embodiments are not limited thereto.

The power driving circuit 512 generates switching voltages (e.g., a first switching voltage $V_{SW\_P}$ and a second switching voltage $V_{SW\_N}$) to switch power switches (e.g., a first transistor TR1 and a second transistor TR2) based on PWM control signals PWM_P and PWM_N input from the processor 550. Here, each of the PWM control signals PWM_P and PWM_N may be a signal complementary to each other. Each of the PWM control signals PWM_P and PWM_N may be a pulse signal having a certain duty ratio or frequency.

The voltage boost circuit 513 boosts the first voltage V1 output from the DC/DC converter 511 to a second voltage according to a first switching voltage $V_{SW\_P}$ and a second switching voltage $V_{SW\_N}$, and supplies the second voltage to an oscillator P.

When the first switching voltage $V_{SW\_P}$ is in a first state (e.g., high or low state) and the second switching voltage $V_{SW\_N}$ is in a second state (e.g., low or high state), as current flow between the ground and one of a first inductor L1 and a second inductor L2 is allowed, energy corresponding to a change in current flowing through the one inductor may be stored in the one inductor, and as current flow between the ground and the other among the first inductor L1 and the second inductor L2 is blocked, energy stored in the other inductor may be delivered to the oscillator.

When the first switching voltage $V_{SW\_P}$ is in a high state, current flow between a source electrode and a drain terminal of the first transistor TR1 may be allowed. Therefore, current flow between the first inductor L1 and the ground may be allowed. The first inductor L1 is also connected to the oscillator P, but the oscillator P has a load value (e.g., capacitance) that is not zero, whereas the ground resistance is zero or substantially close to zero, and thus, current flowing through the first inductor L1 may all be substantially delivered to the ground. The current flows through the first inductor L1, and thus, the first inductor L1 may store energy corresponding to the current.

When the second switching voltage Vsw_n is in a low state, current flow between a source electrode and a drain terminal of a second transistor TR2 may be blocked. Accordingly, energy stored in the second inductor L2 may be supplied to the oscillator P. For example, current flowing through the oscillator P may correspond to current flowing through the second inductor L2.

When the first switching voltage $V_{SW\_P}$ in a low state, current flow between the source electrode and the drain terminal of the first transistor TR1 may be blocked. Accordingly, energy stored in the first inductor L1 may be supplied to the oscillator P. For example, the current I flowing through the oscillator P may correspond to the current flowing through the first inductor L1.

When the second switching voltage $V_{SW\_N}$ is in a high state, current flow between the source electrode and the drain terminal of the second transistor TR2 may be allowed. Therefore, current flow between the second inductor L2 and the ground may be allowed. The second inductor L2 is also connected to the oscillator P, but the oscillator P has a load value (e.g., capacitance) that is not zero, whereas the ground resistance is zero or substantially close to zero, and thus, the current $I_2$ flowing through the second inductor L2 may all be substantially delivered to the ground. The current $I_2$ flows through the second inductor L2, and thus, the second inductor L2 may store energy corresponding to the current $I_2$.

Each of the first switching voltage $V_{SW\_P}$ and the second switching voltage $V_{SW\_N}$ corresponds to a voltage signal that has a frequency corresponding to a PWM signal and repeats a high state or a low state, and switching states may be rapidly repeated. Back electromotive force of the inductor may be proportional to an inductance value L of the inductor and a change in current over time di/dt as shown in the following Equation 4.

$$V = L\frac{di}{dt} \quad \text{[Equation 4]}$$

Therefore, as the first voltage increases, the current flowing through the inductor increases, or the higher the switching speed (i.e., the shorter the period of the PWM signal), the higher the voltage may be applied to the oscillator. In an embodiment, a peak-to-peak voltage value of an alternating-current voltage supplied to the oscillator P may be about 55 V to about 70 V. This may be a value corresponding to a minimum of 13.1 times to a maximum of 20.6 times the battery voltage (e.g., about 3.4 V to about 4.2 V).

In an embodiment, considering the resonant frequency of the first inductor L1 or the second inductor L2 and the oscillator in the circuit, or the frequency of the PWM signal or the frequency of a switching voltage signal provided from the processor 550, a capacitance value or range of the value of the oscillator may be determined. Determining of a capacitance value or range of the value of the oscillator is the same as described with reference to Equation 1.

Table 2, below, shows a result of comparing atomization performance according to a capacitance value of the oscillator for various samples. Here, D refers to the diameter of the oscillator, T refers to the thickness, Zr refers to the impedance, C refers to the capacitance, and Fr refers to the resonant frequency. Also, during the test, the inductance value and system frequency of the inductor were fixed to 4.7 μH and 3 MHZ, respectively, and then the atomization amount test was performed with the following specifications. It was confirmed that Sample 2 had a capacitance value of 0.53 nF and an atomization amount of 1.5 mg, meaning that the atomization performance was lowered, and it was confirmed that Sample 5 was not atomized when Sample 5 had a capacitance value of 1.240 nF.

TABLE 2

| | D (Φ) | T (mm) | Zr (Ω) | C (nF) | Fr (MHz) | Atomization amount (liquid reduction amount) |
|---|---|---|---|---|---|---|
| Sample 1 | 8 | 0.71 | 1.55 | 0.726 | 2.93 | 15 mg |
| Sample 2 | 8 | 0.73 | 9.78 | 0.530 | 3.00 | 1.5 mg |
| Sample 3 | 8 | 0.69 | 3.50 | 1.05 | 2.91 | 21.8 mg |
| Sample 4 | 8 | 0.68 | 2.11 | 0.670 | 3.15 | 7.2 mg |
| Sample 5 | 8 | 0.68 | 2.7 | 1.240 | 3.03 | Not atomized |
| Sample 6 | 8 | 0.68 | 6 | 0.690 | 3.02 | 8.6 mg |

Therefore, each of Samples 1, 3, 4, and 6 had a capacitance value of 0.6 nF to 1.1 nF and exhibited relatively excellent atomization performance. In an embodiment, the oscillator having optimal efficiency could be designed by adjusting a property value of the oscillator after a capacitance value or range of the value of the oscillator is determined.

Table 3, below, is a table of a result of testing a property value of an ultrasonic oscillator based on a capacitance value. Here, the initial values are property values of the oscillator before an atomization test, and the latter values are property values thereof after 20 cycles (10 puffs/1 cycle) test.

TABLE 3

| | Final characteristic change value | | | | |
|---|---|---|---|---|---|
| Items | C (nF) | Fa (MHz) | Fr (MHz) | Zr | Qm |
| Initial value | 1.05 | 3.16 | 2.91 | 3.50 | 97.93 |
| Latter value | 1.15 | 3.13 | 2.91 | 1.66 | 211.23 |
| Variation | 0.1 | −0.03 | 0 | −1.84 | 113.30 |

It could be confirmed that when the property value was determined based on the capacitance value according to the result of the test, compared to the initial value, there was little change in characteristics of the oscillator, no decrease in the amount of atomization, and an increase in Qm. Therefore, it may be confirmed that the durability of the oscillator is excellent. A cartridge 10' according to an embodiment shown in FIGS. 6 to 9 may be another embodiment of the cartridge 10 of the aerosol generating device 1000, and hereinafter, redundant descriptions will be omitted.

Referring to FIGS. 6 to 9, the cartridge 10' according to another embodiment may include a housing 100', a discharge passage 150', a mouthpiece 160', a storage 200', a liquid delivery element 300', an atomizer 400', and a printed circuit board 500'. The components of the cartridge 10' according to another embodiment are not limited to the above-described examples, and at least one component may be added or any one component (e.g., the mouthpiece 160') may be omitted according to an embodiment.

The housing 100' forms the overall appearance of the cartridge 10', and may include an internal space in which the components of the cartridge 10' may be arranged. In FIGS. 6 to 9, the embodiment in which the housing 100' of the cartridge 10' has a quadrangular pole shape as a whole is shown, but embodiments are not limited thereto. In another embodiment (not shown), the housing 100' may be formed in a cylindrical shape as a whole, or may be formed in a shape of a polygonal pole (e.g., a triangular pole and a pentagonal pole) other than a quadrangular pole.

In an embodiment, the housing 100' may include a first housing 110' and a second housing 120' connected to an area of the first housing 110', and the first housing 110' and the second housing 120' may protect the components of the cartridge 10', which are arranged in an internal space formed by a combination of the first housing 110' and the second housing 120'.

For example, the first housing 110' (or "upper housing") is coupled to an area located at the top (e.g., z direction) of the second housing 120' (or "lower housing") to form an internal space, in which the components of the cartridge 10' may be arranged, between the first housing 110' and the second housing 120', but embodiments are not limited thereto.

In the disclosure, the term "top" refers to a "z" direction in FIGS. 6 to 9, the term "bottom" may refer to a "−z" direction in FIGS. 6 to 9, which faces a direction opposite to the top, and these terms may be used to have the same meanings, respectively, hereinafter.

The mouthpiece 160' is a portion inserted into a user's oral cavity, and may be connected to an area of the housing 100'. For example, the mouthpiece 160' may be connected to one area (e.g., an upper area of the first housing 110') of the first housing 110' opposite to another area of the first housing 110', wherein the other area of the first housing 110' is connected to the second housing 120'.

In an embodiment, the mouthpiece 160' may be detachably/attachably coupled to an area of the housing 100', but the mouthpiece 160' and the housing 100' may be integrally formed according to an embodiment.

The mouthpiece 160' may include at least one outlet **160*e*' for discharging an aerosol generated in the cartridge 10' to the outside of the cartridge 10'. A user may contact his/her oral cavity to the mouthpiece 160' and receive an aerosol discharged to the outside through the outlet 160*c*' of the mouthpiece 160'**.

The storage 200' may be arranged in the internal space of the first housing 110', and an aerosol generating material may be stored in the storage 200'. For example, the storage 200' may store a liquid aerosol generating material, but embodiments are not limited thereto.

The liquid delivery element 300' may be located between the storage 200' and the atomizer 400', and the aerosol generating material stored in the storage 200' may be supplied to the atomizer 400' through the liquid delivery element 300'.

In an embodiment, the liquid delivery element 300' may receive an aerosol generating material from the storage 200', and may deliver the received aerosol generating material to the atomizer 400'. For example, the liquid delivery element 300' may absorb an aerosol generating material that moves toward the liquid delivery element 300' from the storage 200', and the absorbed aerosol generating material may move along the liquid delivery element 300' and may be supplied to the atomizer 400'.

In an embodiment, the liquid delivery element 300' may include a plurality of liquid delivery elements. For example, the liquid delivery element 300' may include a first liquid delivery element 310' and a second liquid delivery element 320'.

The first liquid delivery element 310' is arranged adjacent to the storage 200', and thus may receive a liquid aerosol generating material from the storage 200'. For example, the first liquid delivery element 310' may receive an aerosol generating material from the storage 200' by absorbing at least some of aerosol generating materials discharged from the storage 200'.

For example, an aerosol generating material stored in the storage 200' may be discharged to the outside of the storage 200' through a liquid supply hole (not shown) formed in an area of the storage 200', the area facing the first liquid delivery element 310', but embodiments are not limited thereto.

The second liquid delivery element 320' is located between the first liquid delivery element 310' and the atomizer 400', and an aerosol supplied to the first liquid delivery element 310' may be delivered to the atomizer 400'. For example, the second liquid delivery element 320' is located at the bottom (e.g., −z direction) of the first liquid delivery element 310', and may supply an aerosol generating material absorbed by the first liquid delivery element 310' to the atomizer 400'.

In an embodiment, one area of the second liquid delivery element 320' may be in contact with an area of the first liquid delivery element 310', the area facing the −z direction, and the other area of the second liquid delivery element 320' may be in contact with an area of the atomizer 400', the area facing the z direction.

In other words, the atomizer 400', the second liquid delivery element 320', and the first liquid delivery element 310' may be sequentially arranged in a longitudinal direction (e.g., z direction) of the cartridge 10' or the housing 100', and as a result, the second liquid delivery element 320' and the first liquid delivery element 310' may be sequentially stacked on the atomizer 400'.

Through the above-described arrangement structure, at least some of aerosol generating materials supplied from the storage 200' to the first liquid delivery element 310' may move to the second liquid delivery element 320' in contact with the first liquid delivery element 310'. Also, an aerosol generating material that has moved to the second liquid delivery element 320' may move along the second liquid delivery element 320' and reach the atomizer 400' in contact with the second liquid delivery element 320'.

In FIGS. 6 to 9, the embodiment in which the liquid delivery element 300' includes two liquid delivery elements is shown, but in an embodiment, the liquid delivery element 300' may include one liquid delivery element or three or more liquid delivery elements.

The atomizer 400' may atomize a liquid aerosol generating material supplied from the liquid delivery element 300', thereby generating an aerosol.

For example, the atomizer 400' may include an oscillator that generates ultrasonic vibration. A frequency of the ultrasonic vibration generated by the oscillator may be about 100 kHz to about 10 MHZ, for example, about 100 kHz to about 3.5 MHz. As the oscillator generates ultrasonic vibration in the above-described frequency band, the oscillator may vibrate in a longitudinal direction (e.g., z direction or −z direction) of the cartridge 10' or the housing 100'. However, embodiments are not limited by the direction in which the oscillator vibrates, and the direction in which the oscillator vibrates may be changed to various directions (e.g., one of z and −z directions, x and −x directions, and y and −y directions or a combination thereof).

The atomizer 400' may atomize an aerosol generating material by an ultrasonic method, thereby generating an aerosol at a relatively low temperature compared to a method of heating an aerosol generating material. For example, when an aerosol generating material is heated by using a heater, the aerosol generating material may be unintentionally heated to a temperature of 200° ° C. or more, and thus, a user may feel a burnt taste in an aerosol.

In contrast, by atomizing an aerosol generating material by the ultrasonic method, the cartridge 10' according to an embodiment may generate an aerosol in a temperature range of about 100° C. to about 160° C., which is a lower temperature than when an aerosol generating material is heated by using a heater. Accordingly, the cartridge 10' may minimize the feeling of a burnt taste in an aerosol, thereby improving a user's feeling of smoking.

The atomizer 400' may be electrically connected to an external power source (e.g., the battery 510 located in the main body 20 in FIG. 2) through the printed circuit board 500', and may generate ultrasonic vibration by electric power supplied from the external power source. For example, as the atomizer 400' is electrically connected to the printed circuit board 500' located in the cartridge 10', and the printed circuit board 500' is electrically connected to a power source outside the cartridge 10', the atomizer 400' may receive electric power from the external power source.

In an embodiment, the atomizer 400' may be electrically connected to the printed circuit board 500' through a first conductor 410' and a second conductor 420'.

In an embodiment, the first conductor 410' may include a material (e.g., a metal) having electrical conductivity, and may be located at the top of the atomizer 400' to electrically connect the atomizer 400' to the printed circuit board 500'.

For example, one portion (e.g., an upper portion) of the first conductor 410' may be arranged to surround at least one area of an outer circumferential surface of the atomizer 400' to be in contact with the atomizer 400', and the other portion (e.g., a lower portion) of the first conductor 410' may be one portion formed to extend toward the printed circuit board 500' to be in contact with an area of the printed circuit board 500'. The atomizer 400' and the printed circuit board 500' may be electrically connected to each other by the above-described contact structure of the first conductor 410'.

In an example, an opening **410*h*' may be formed in a portion of the first conductor 410', and thus, at least a portion of the atomizer 400' may be exposed to the outside of the first conductor 410'. An area of the atomizer 400', which is exposed to the outside of the first conductor 410' through the opening 410*h*' of the first conductor 410', may be in contact with the second liquid delivery element 320' to receive an aerosol generating material from the second liquid delivery element 320'**.

In an embodiment, the second conductor 420' may include a material having electrical conductivity, and may be located at the bottom of the atomizer 400' or located between the atomizer 400' and the printed circuit board 500' to electrically connect the atomizer 400' to the printed circuit board 500'. For example, as one end of the second conductor 420' is in contact with a lower area of the atomizer 400', and the other end thereof is in contact with an area of the printed circuit board 500', the area facing the atomizer 400', the atomizer 400' and the printed circuit board 500' may be electrically connected to each other.

In an embodiment, the second conductor 420' may include a conductive material having elasticity, thereby not only electrically connecting the atomizer 400' to the printed circuit board 500', but also elastically supporting the atomizer 400'. For example, the second conductor 420' may include a conductive spring, but the second conductor 420' is not limited to the above-described embodiment.

The cartridge 10' according to an embodiment may further include an elastic support 430' that is located between the atomizer 400' and the printed circuit board 500' to support the second conductor 420'. The elastic support 430' may include, for example, a material having flexible characteristics, and may be arranged to surround an outer circumferential surface of the second conductor 420' to elastically support the second conductor 420'. However, the embodiment of the cartridge 10' is not limited thereto, and in an embodiment, the elastic support 430' may be omitted.

In an embodiment, the printed circuit board 500' is located in the second housing 120', and is electrically connected to the atomizer 400' through the first conductor 410' and the second conductor 420', and at the same time, is electrically connected to an external power source (e.g., the battery 510 in FIG. 2) through an electrical connection member (not shown).

The electrical connection member may include at least one of a pogo pin, a wire, a cable, an FPCB, and a C-clip, but the electrical connection member is not limited to the above-described examples.

In an embodiment, the second housing 120' may include a plurality of through holes 121', 122', and 123' penetrating the inside of the second housing 120' and the outside of the cartridge 10', and an electrical connection member may be arranged in the plurality of through holes 121', 122', and 123' to electrically connect the printed circuit board 500' located in the cartridge 10' to a power source outside the cartridge 10'.

As the printed circuit board 500' is electrically connected to the atomizer 400' by the first conductor 410' and the second conductor 420' and is electrically connected to the power source outside the cartridge 10' by the electrical connection member, the atomizer 400' may be electrically connected to the external power source via the printed circuit board 500' to receive electric power from the external power source.

A resistor R for removing noise (or a "noise signal") that occurs during an operation of the cartridge 10' may be mounted on at least an area of the printed circuit board 500', and the resistor R may prevent damage to the atomizer 400' by removing noise.

An aerosol atomized by ultrasonic vibration generated from the atomizer 400' may be discharged to the outside of the cartridge 10' through the discharge passage 150' and supplied to a user. For example, the discharge passage 150' is formed to connect or communicate the internal space of the housing 100' to or with the outlet **160*e*' of the mouthpiece 160', and thus, an aerosol generated by the atomizer 400' may flow through the discharge passage 150' and then be discharged to the outside of the cartridge 10' through the outlet 160*e*'**.

In an embodiment, the discharge passage 150' may be located in the internal space of the housing 100', and at least an area of an outer circumferential surface of the discharge passage 150' may be arranged to be surrounded by the storage 200', but embodiments are not limited thereto.

The cartridge 10' according to an embodiment may further include a sealing element 130' for preventing leakage generated from the storage 200' from flowing into the discharge passage 150'.

According to a comparative embodiment, as the outer circumferential surface of the discharge passage 150' is arranged to be surrounded by the storage 200', leakage generated from the storage 200' may flow into the discharge passage 150', thereby reducing a user's feeling of smoking.

In contrast, the cartridge 10' according to an embodiment may block leakage generated from the storage 200' from flowing into the discharge passage 150' through the sealing element 130', thereby preventing reduction of a user's feeling of smoking.

In an embodiment, the sealing element 130' may be located in the discharge passage 150' to prevent leakage from flowing into the discharge passage 150'. For example, the scaling element 130' may be inserted and fitted into the discharge passage 150' to be in close contact with an inner wall of the discharge passage 150', but embodiments are not limited thereto.

Also, an inside of the sealing element 130' may be formed in a hollow shape, and thus may prevent leakage generated from the storage 200' from flowing into the discharge passage 150' and may not impede the flow of an aerosol generated from the atomizer 400'.

In another embodiment, the sealing element 130' may absorb ultrasonic vibration generated from the atomizer 400' by including a material (e.g., rubber) having elasticity, and as a result, delivery of the ultrasonic vibration generated from the atomizer 400' to a user through the housing 100' of the cartridge 10' may be minimized.

In an embodiment, the sealing element 130' is located on the top of the liquid delivery element 300' to press the liquid delivery element 300' toward the atomizer 400', thereby maintaining contact between the liquid delivery element 300' and the atomizer 400'. For example, the sealing portion 130' may maintain contact between the second liquid delivery element 320' and the atomizer 400' by pressing the first liquid delivery element 310' and/or the second liquid delivery element 320' in the −z direction.

The cartridge 10' according to an embodiment may further include a structure 140' for preventing droplets emitted from the atomizer 400' from being supplied to a user, and a first support element 141' that fixes or supports the structure 140'.

During a process in which aerosol generating materials are atomized by ultrasonic vibration generated from the atomizer 400', some aerosol generating materials may not be atomized, resulting in the formation of droplets, and the droplets may be emitted by the ultrasonic vibration generated from the atomizer 400' and discharged to the outside of the cartridge 10' through the outlet **160*e*'**.

The structure 140' is arranged adjacent to the discharge passage 150', and thus may restrict emitted droplets from moving and flowing toward the outlet **160*e*' of the mouthpiece 160'**.

For example, the structure 140' may absorb droplets emitted from the atomizer 400' by including a material (e.g., felt material) capable of absorbing droplets, thereby restricting the droplets from moving or flowing toward the outlet **160*e*'**, but embodiments are not limited thereto.

According to a comparative embodiment, when droplets emitted from the atomizer 400' are discharged to the outside of the cartridge 10' through the outlet **160*e*'** and delivered to a user, the user may feel uncomfortable, and thus, the overall feeling of smoking may be reduced.

In contrast, through the structure 140', the cartridge 10' according to an embodiment may restrict droplets that are not atomized and emitted from the atomizer 400' from moving toward the outlet **160*e*'**, thereby reducing the reduction of a user's feeling of smoking due to the emission of the droplets. In the disclosure, the expression "emission of droplets" may be to mean that droplets that are not atomized are emitted, and the expression may be used to have the same meaning hereinafter.

The first support element 141' may accommodate at least an area of the structure 140' and hold or fix the structure 140' in an area of the first housing 110'. For example, the first support element 141' may hold or fix the structure 140' in or to an area (e.g., an upper area) of the first housing 110', wherein the area is adjacent to the mouthpiece 160', but embodiments are not limited thereto.

In an embodiment, the first support element 141' may be arranged to surround at least an area of the structure 140' to accommodate the structure 140', and as the first support element 141' accommodating the structure 140' is coupled to an area (e.g., an area of the z direction) of the first housing 110', the structure 140' may be fixed to the area of the first housing 110'.

The first support element 141', accommodating the structure 140', and the first housing 110' may be coupled in such a manner that at least a portion of the first support element 141' is interference-fitted to the first housing 110', but a method of coupling the first housing 110' to the first support element 141' is not limited thereto. In another example, the first housing 110' and the first support element 141' may also be coupled by at least one of a snap-fit method, a screw coupling method, and a magnetic coupling method.

The first support element 141' may include a material (e.g., rubber) having a certain rigidity and waterproofness, thereby not only fixing the structure 140' to the first housing 110', but also preventing leakage of aerosol generating materials from the storage 200'. For example, the first support element 141' may block an area of the storage 200', the area facing the mouthpiece 160', thereby preventing leakage of aerosol generating materials.

The cartridge 10' according to an embodiment may further include a second support element 330' for holding the liquid delivery element 300' and/or the atomizer 400' inside the first housing 110'.

The second support element 330' may be arranged to surround at least a portion of an outer circumferential surface of the first liquid delivery element 310', the second liquid delivery element 320', and/or the atomizer 400' to accommodate the first liquid delivery element 310', the second liquid delivery element 320', and/or the atomizer 400'.

In an embodiment, the second support element 330' may be coupled to one area (e.g., an area of the −z direction) of the first housing 110' opposite to the other area of the first housing 110', and as a result, the first liquid delivery element 310', the second liquid delivery element 320', and/or the atomizer 400' may be held in or fixed to the area of the first housing 110'.

The second support element 330' may be coupled to the first housing 110' in such a manner that at least a partial area of the second support element 330' is interference-fitted to the first housing 110', but a method of coupling the first housing 110' to the second support element 330' is not limited to the above-described example. In another example, the first housing 110' and the second support element 330' may also be coupled by at least one of a snap-fit method, a screw coupling method, and a magnetic coupling method.

In an embodiment, the second support element 330' may include a material (e.g., rubber) having a certain rigidity and waterproofness, thereby not only fixing the liquid delivery element 300' and the atomizer 400' to the first housing 110', but also preventing leakage of aerosol generating materials from the storage 200'. For example, the second support element 330' may block an area of the storage 200', wherein the area is adjacent to the liquid delivery element 300' or the atomizer 400', thereby preventing leakage of aerosol generating materials.

Hereinafter, referring to FIGS. 10 and 11, an electrical connection structure of the atomizer 400' and the printed circuit board 500', and an electrical connection relationship between the resistor R mounted on the printed circuit board 500' and the atomizer 400' are described in detail.

FIG. 10 is an exploded perspective view for describing an electrical connection relationship between an oscillator and a printed circuit board of a cartridge, according to an embodiment, and FIG. 11 is a cross-sectional view for describing the electrical connection relationship between the oscillator and the printed circuit board of the cartridge shown in FIG. 10.

Referring to FIGS. 10 and 11, a cartridge (e.g., the cartridge 10' in FIGS. 6 to 9) according to an embodiment may include an atomizer 400', a printed circuit board 500', and a first conductor 410' and a second conductor 420' for electrically connecting atomizer 400' to the printed circuit board 500'.

The printed circuit board 500' may include a first surface arranged toward the atomizer 400' and a second surface arranged to be opposite to the first surface, and the a plurality of electrical contacts for electrically connecting the printed circuit board 500' to the atomizer 400' and/or an external power source (e.g., the battery 510 in FIG. 2) may be arranged on the first and second surfaces of the printed circuit board 500'.

In an embodiment, a first electrical contact 501' and a second electrical contact 502' spaced apart from the first electrical contact 501' may be arranged on the first surface of the printed circuit board 500'.

One portion (or an "upper portion") of the first conductor 410' may be arranged to surround at least an area of an outer circumferential surface of the atomizer 400' to be in contact with the atomizer 400', and the other portion (or a "lower portion") of the first conductor 410' may be in contact with the first electrical contact 501' of the printed circuit board 500'. The atomizer 400' and the first electrical contact 501' may be electrically connected to each other by the above-described arrangement structure of the first conductor 410'.

The second conductor 420' is located between the atomizer 400' and the printed circuit board 500', and one end (e.g., one end in a z direction) of the second conductor 420' may be in contact with an area of the atomizer 400', the area facing the printed circuit board 500', and the other end (e.g., one end in a −z direction) of the second conductor 420' may be in contact with the second electrical contact 502' of the printed circuit board 500'. The atomizer 400' and the second electrical contact 502' may be electrically connected to each other by the above-described arrangement structure of the second conductor 420'.

In an embodiment, the atomizer 400' may include a first electrode 401' (or an "upper electrode") arranged in an area of the atomizer 400', the area facing a direction opposite to the printed circuit board 500', and a second electrode 402' (or a "lower electrode") arranged in an area of the atomizer 400', the area facing the printed circuit board 500'.

The first electrode 401' and/or the second electrode 402' may include a material having a high electrical conductivity, thereby electrically connecting the atomizer 400' to the first conductor 410' and/or the second conductor 420'. The first electrode 401' and/or the second electrode 402' may include, for example, one of silver (Ag), copper (Cu), gold (Au), aluminum (Al), tungsten (W), iron (Fc), platinum (Pt), and lead (Pb), but is not limited thereto.

In FIGS. 10 and 11, the embodiment in which the first electrode 401' is arranged along the edge of the atomizer 400', and the second electrode 402' is arranged at the center of an area of the atomizer 400', the area facing the printed circuit board 500', is shown, but the arrangement structure of the first electrode 401' and/or the second electrode 402' is not limited to the shown embodiment. In another embodiment, the first electrode 401' may be arranged only on a portion of the edge of the atomizer 400', or the second electrode 402' may be arranged in an area deviated from the center of the atomizer 400'.

In an embodiment, one portion of the first conductor 410' is arranged to surround an outer circumferential surface of the atomizer 400' to be in contact with the first electrode 401' arranged in an area of the atomizer 400', the other portion of the first conductor 410' is in contact with the first electrical contact 501' of the printed circuit board 500', and thus, the atomizer 400' and the first electrical contact 501' may be electrically connected to each other.

In another embodiment, one end of the second conductor 420' is in contact with the second electrode 402' of the atomizer 400', the other end of the second conductor 420' is in contact with the second electrical contact 502' of the printed circuit board 500', and thus, the atomizer 400' and the second electrical contact 502' may be electrically connected to each other.

In other words, the cartridge 10' according to an embodiment may electrically connect the atomizer 400' to the printed circuit board 500' through the first conductor 410' and the second conductor 420', the first conductor 410' being in contact with the first electrode 401' of the atomizer 400' and the first electrical contact 501' of the printed circuit board 500', and the second conductor 420' being in contact with the second electrode 402' of the atomizer 400' and the second electrical contact 502' of the printed circuit board 500'.

In an embodiment, a third electrical contact 501-1' and a fourth electrical contact 502-1' may be arranged on the second surface opposite to the first surface of the printed circuit board 500'.

In an embodiment, the third electrical contact 501-1' is arranged at a position corresponding to the first electrical contact 501' arranged on the first surface of the printed circuit board 500', and may be electrically connected to the first electrical contact 501' through a first conductive via $V_1$.

For example, the third electrical contact 501-1' may be arranged at a position overlapped by the first electrical contact 501' when viewed from the first surface of the printed circuit board 500', and the first conductive via $V_1$ may be located between the first electrical contact 501' and the third electrical contact 501-1' to connect the first electrical contact 501' to the third electrical contact 501-1'.

For example, the first conductive via $V_1$ may be arranged to penetrate the first and second surfaces of the printed circuit board 500' to electrically connect the first electrical contact 501' to the third electrical contact 501-1'.

In an embodiment, the fourth electrical contact 502-1' is arranged at a position corresponding to the second electrical contact 502' arranged on the first surface of the printed circuit board 500', and may be electrically connected to the second electrical contact 502' through a second conductive via $V_2$.

For example, the fourth electrical contact 502-1' may be arranged at a position overlapped by the second electrical contact 502' when viewed from the first surface of the printed circuit board 500', and the second conductive via $V_2$ may be located between the second electrical contact 502' and the fourth electrical contact 502-1' to connect the second electrical contact 502' to the fourth electrical contact 502-1'.

For example, the second conductive via $V_2$ may be arranged to penetrate the first and second surfaces of the printed circuit board 500' to electrically connect the second electrical contact 502' to the fourth electrical contact 502-1'.

The third electrical contact 501-1' is arranged at a position corresponding to a first through hole (e.g., the through hole 121' in FIG. 8) of a second housing (e.g., the second housing 120' in FIG. 8), and thus may be electrically connected to an external power source through an electrical connection member arranged in the first through hole. For example, the third electrical contact 501-1' may be electrically connected to a battery (e.g., the battery 510 in FIG. 2) of a main body (e.g., the main body 20 in FIG. 2) through the electrical connection member arranged in the first through hole.

Also, the fourth electrical contact 502-1' is arranged at a position corresponding to a second through hole (e.g., the through hole 122' in FIG. 8) of the second housing, and thus may be electrically connected to the external power source through an electrical connection member arranged in the second through hole. For example, the fourth electrical contact 502-1' may be electrically connected to the battery of the main body through the electrical connection member arranged in the second through hole.

The printed circuit board 500' of the cartridge 10' according to an embodiment may operate as a medium for electrically connecting the atomizer 400' to an external power source (e.g., a battery of a main body) as the first electrical contact 501' and the second electrical contact 502' are arranged on the first surface, and the third electrical contact 501-1' and the fourth electrical contact 502-1', which are respectively electrically connected to the first electrical contact 501' and the second electrical contact 502', are arranged on the second surface.

As the first electrical contact 501' and the second electrical contact 502' of the printed circuit board 500' are electrically connected to the atomizer 400', and the third electrical contact 501-1' and the fourth electrical contact 502-1' are electrically connected to the battery of the main body, an electrical circuit between the atomizer 400' and the external power source may be formed.

The atomizer 400' may atomize an aerosol generating material into an aerosol by receiving electric power from the external power source through the electrical circuit formed between the atomizer 400' and the external power source. For example, the electric power supplied from the external power source may be delivered to the atomizer 400' through the printed circuit board 500' arranged in the cartridge, and the atomizer 400' may generate an aerosol by generating ultrasonic vibration through the received electric power.

In an embodiment, the printed circuit board 500' may further include a fifth electrical contact 503' arranged on the first surface, and a sixth electrical contact 503-1' arranged in an area of the second surface, the area corresponding to the fifth electrical contact 503'.

The fifth electrical contact 503' may be arranged at a position corresponding to or overlapping the sixth electrical contact 503-1' when viewed from the first surface of the printed circuit board 500', and a third conductive via $V_3$ may be arranged between the fifth electrical contact 503' and the sixth electrical contact 503-1' to electrically connect the fifth electrical contact 503' to the sixth electrical contact 503-1'.

In an embodiment, as the fifth electrical contact 503' is in contact with an area of the first conductor 410', the atomizer 400' and the fifth electrical contact 503' may be electrically connected to each other.

In another example, the sixth electrical contact 503-1' is arranged at a position corresponding to a third through hole (e.g., the through hole 123' in FIG. 8) of a second housing, and thus may be electrically connected to an external power source (a battery of a main body) through an electrical connection member arranged in the third through hole.

The cartridge according to an embodiment may allow the atomizer 400' and the printed circuit board 500' to be electrically connected to each other even when the first conductor 410' is in contact with only one of two electrical contacts (the first electrical contact 501' and the fifth electrical contact 503'), by arranging the two electrical contacts electrically connected to the first conductor 410' on the first surface of the printed circuit board 500'.

Even when the first conductor 410' is in contact with only one of the first electrical contact 501' and the fifth electrical contact 503', the atomizer 400' and the printed circuit board 500' may be electrically connected to each other, and thus, an electrical connection relationship between the atomizer 400' and the printed circuit board 500' may be maintained regardless of the arrangement direction of the printed circuit board 500'.

The first electrical contact 501' to the sixth electrical contact 503-1' may be, for example, conductive pads or soldering pads mounted on the printed circuit board 500', but are not limited thereto.

A resistor R for removing or filtering out noise that occurs in a process of supplying electric power from an external power source to the atomizer 400' or occurs in a circuit of the printed circuit board 500' may be arranged in an area of the printed circuit board 500'.

In an embodiment, the resistor R is mounted on an area of the printed circuit board 500' to remove noise that occurs when the aerosol generating device operates (or is “powered on”), thereby allowing supply of a stable voltage to the atomizer 400'.

Unintentional noise may occur in the electrical circuit between the atomizer 400' and the external power source at a time point at which supply of electric power to the atomizer 400' is started or during a process of supply of electric power. For example, noise may occur in a voltage signal supplied to the atomizer 400' such that a voltage greater than a specified value may be supplied to the atomizer 400'. Accordingly, in a comparative embodiment, the temperature of the atomizer 400' rapidly increases (e.g., increases above the Curie temperature), and thus, the atomizer 400' may be damaged.

In contrast, the cartridge according to an embodiment may remove or filter out noise that occurs in the electrical circuit formed between the atomizer 400' and the external power source in the atomizer 400' through the resistor R mounted on the printed circuit board 500', and as a result, the cartridge or the aerosol generating device may be stably operated.

Embodiments of the present disclosure may be implemented in the form of a computer-readable recording medium including instructions executable by a computer, such as a program module executable by the computer. The computer-readable recording medium may be any available medium that can be accessed by a computer, including both volatile and nonvolatile media, and both removable and non-removable media. In addition, the computer-readable recording medium may include both a computer storage medium and a communication medium. The computer storage medium includes all of volatile and nonvolatile media, and removable and nonremovable media implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer media.

Those of ordinary skill in the art pertaining to the present embodiments understand that various changes in form and details can be made therein without departing from the scope of present disclosure. The disclosed methods should be considered in descriptive sense only and not for purposes of limitation. All differences within the scope of equivalents should be construed as being included in the present disclosure.

The invention claimed is:

1. An aerosol generating device comprising:

a storage configured to store an aerosol generating material;

a liquid delivery element configured to absorb the aerosol generating material stored in the storage; and an atomizer configured to atomize the aerosol generating material absorbed by the liquid delivery element into an aerosol by generating ultrasonic vibrations, wherein the atomizer comprises an oscillator, and the oscillator has a capacitance value in a range of 0.6 nF to 1.1 nF.

2. The aerosol generating device of claim 1, wherein the oscillator has a property value according to the range of the capacitance value.

3. The aerosol generating device of claim 2, wherein the property value of the oscillator comprises at least one value from among a piezoelectric constant, an electromechanical coupling coefficient, a mechanical quality factor, a Curie temperature, and an additive.

4. The aerosol generating device of claim 3, wherein the additive comprises at least one of cobalt (Co), antimony (Sb), and niobium (Nb).

5. The aerosol generating device of claim 1, wherein a thickness of the oscillator is 0.69 mm to 0.71 mm.

6. The aerosol generating device of claim 1, wherein a diameter of the oscillator is 7 mm to 9 mm.

7. The aerosol generating device of claim 1, wherein the oscillator comprises lead zirconate titanate (PZT).

8. The aerosol generating device of claim 1, wherein the liquid delivery element comprises:

a first liquid delivery element arranged adjacent to the storage and configured to receive the aerosol generating material from the storage; and a second liquid delivery element located between the first liquid delivery element and the atomizer, and configured to deliver the aerosol generating material supplied to the first liquid delivery element to the atomizer.

9. The aerosol generating device of claim 8, further comprising:

a mouthpiece comprising an outlet for discharging the aerosol to an outside of the aerosol generating device; and a discharge passage configured to connect the atomizer to the outlet, wherein the aerosol moves toward the outlet through the discharge passage.

10. The aerosol generating device of claim 9, wherein the first liquid delivery element is configured to restrict droplets emitted from the atomizer from moving toward the discharge passage.

11. The aerosol generating device of claim 1, further comprising:

a battery configured to supply a battery voltage; and a power conversion circuit configured to supply an alternating-current voltage to the oscillator by converting the battery voltage, wherein the oscillator has the capacitance value according to an inductance value of an inductor, of the power conversion circuit, and a resonant frequency of the inductor.

12. The aerosol generating device of claim 11, further comprising a processor configured to control the power conversion circuit.

* * * * *